(12) United States Patent
Johnson

(10) Patent No.: US 9,485,088 B2
(45) Date of Patent: Nov. 1, 2016

(54) SYSTEMS AND METHODS FOR DYNAMIC DATA MASKING

(71) Applicant: Combined Conditional Access Development and Support, LLC, San Diego, CA (US)

(72) Inventor: Michael W. Johnson, Escondido, CA (US)

(73) Assignee: Combined Conditional Access Development And Support, LLC, San Diego, CA (US)

(*) Notice: Subject to any disclaimer, the term of this patent is extended or adjusted under 35 U.S.C. 154(b) by 53 days.

(21) Appl. No.: 14/529,720

(22) Filed: Oct. 31, 2014

(65) Prior Publication Data
US 2016/0127123 A1 May 5, 2016

(51) Int. Cl.
*H04L 29/06* (2006.01)
*H04L 9/00* (2006.01)
*H04L 9/06* (2006.01)
*G06F 21/72* (2013.01)

(52) U.S. Cl.
CPC ............ *H04L 9/003* (2013.01); *G06F 21/72* (2013.01); *H04L 9/0631* (2013.01)

(58) Field of Classification Search
CPC ...... H04L 9/003; H04L 9/0631; G06F 21/72
USPC .......................................................... 713/189
See application file for complete search history.

(56) References Cited

U.S. PATENT DOCUMENTS

| 7,720,225 | B2 | 5/2010 | Gebotys | |
|---|---|---|---|---|
| 8,422,668 | B1* | 4/2013 | Thichina | H04L 9/003 380/28 |
| 2008/0205655 | A1* | 8/2008 | Wilkins | G06Q 10/10 380/279 |
| 2010/0220863 | A1* | 9/2010 | Dupaquis | H04L 9/0631 380/277 |
| 2013/0283059 | A1* | 10/2013 | Sabapathy | G06F 21/6254 713/189 |
| 2015/0200772 | A1* | 7/2015 | Yamada | H04L 9/0637 380/28 |

OTHER PUBLICATIONS

Catherine Gebotys, Simon Ho, and Agnes Tiu, "EM Analysis of Rijndael and ECC on a PDA", at Dept. of Electrical and Computer Engineering, University of Waterloo, Waterloo Canada, 2005 (15 pages).
Gladman, "A Specification for Rijndael, the AES Algorithm", v3.16, Aug. 1, 2007 (22 pages).
Paul Kocher, Joshua Jaffe, and Benjamin Jun, "Differential Power Analysis", Cryptography Research, Inc., San Francisco, CA, 1999 (10 pages).
Announcing the Advanced Encrypton Standard (AES), Federal Information Processing Standards Publication 197, Nov. 26, 2001 (51 pages).

\* cited by examiner

*Primary Examiner* — Michaels S McNally
(74) *Attorney, Agent, or Firm* — Ballard Spahr LLP

(57) ABSTRACT

Systems and methods for dynamic data masking are disclosed. The disclosed methods and systems can be used to dynamically mask data in cryptographic operations, such as advanced encryption standard (AES) operations, data encryption standard (DES) operations or triple DES operations. Specifically, data in cryptographic operations can be covered with unlimited and continuously changing masks. As an example, the Substitution table, key schedule, and state register in AES, or key schedule and selection functions in a DES or triple DES can be covered with unlimited and constantly changing masks. In an aspect, dynamic masking operations can be combined with orbital RAM algorithm and no-operation clocks to make power signature analysis in cryptographic attacks even more difficult.

20 Claims, 14 Drawing Sheets

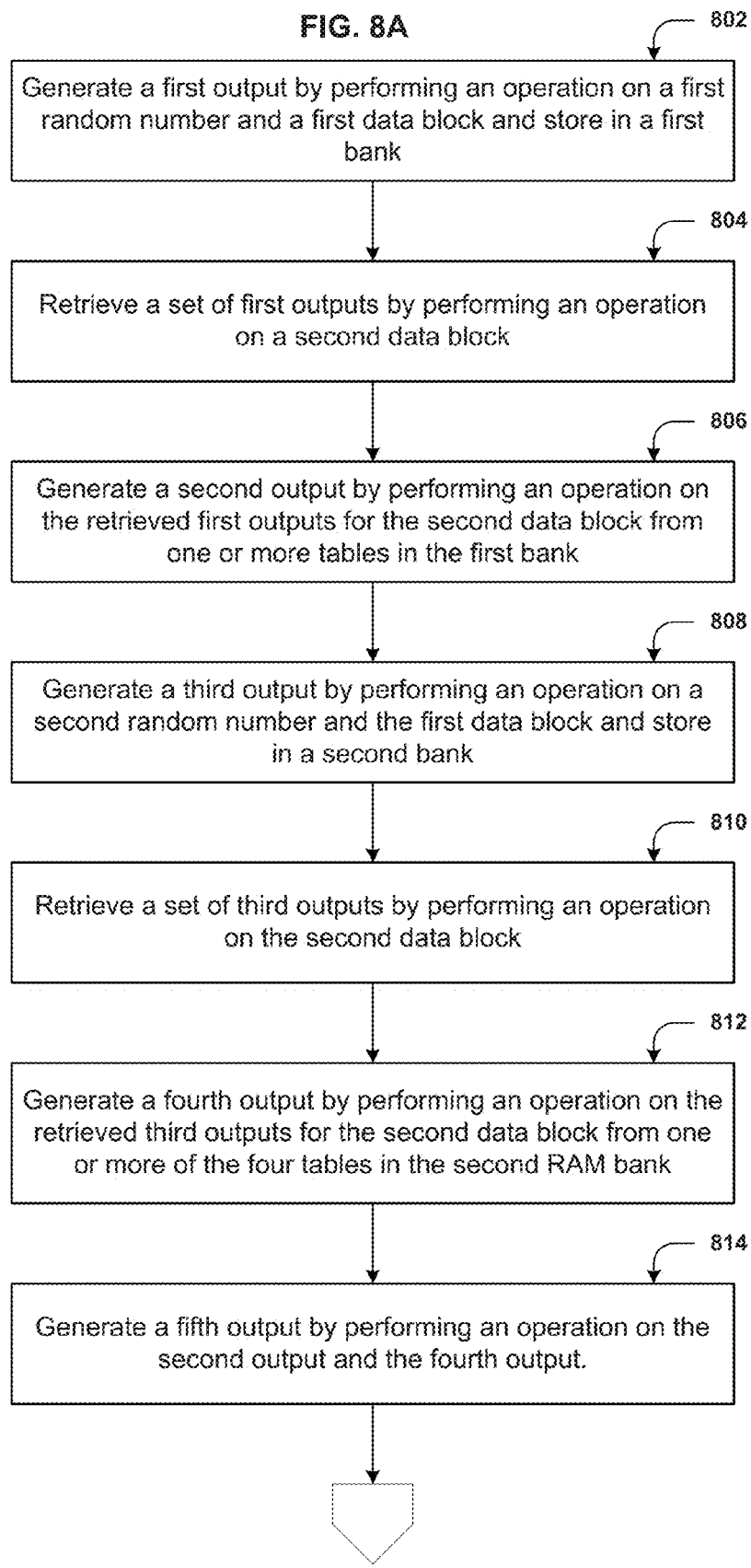

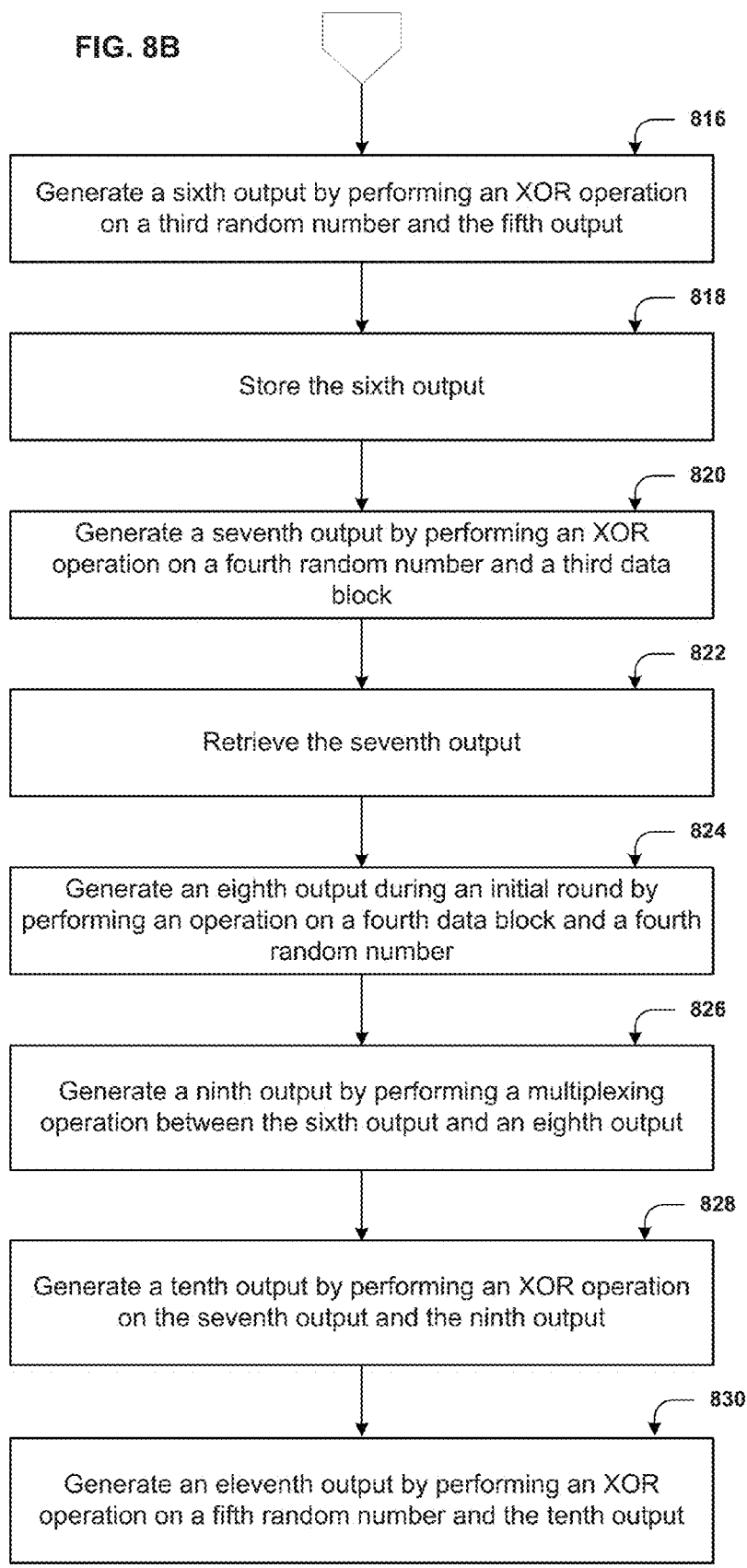

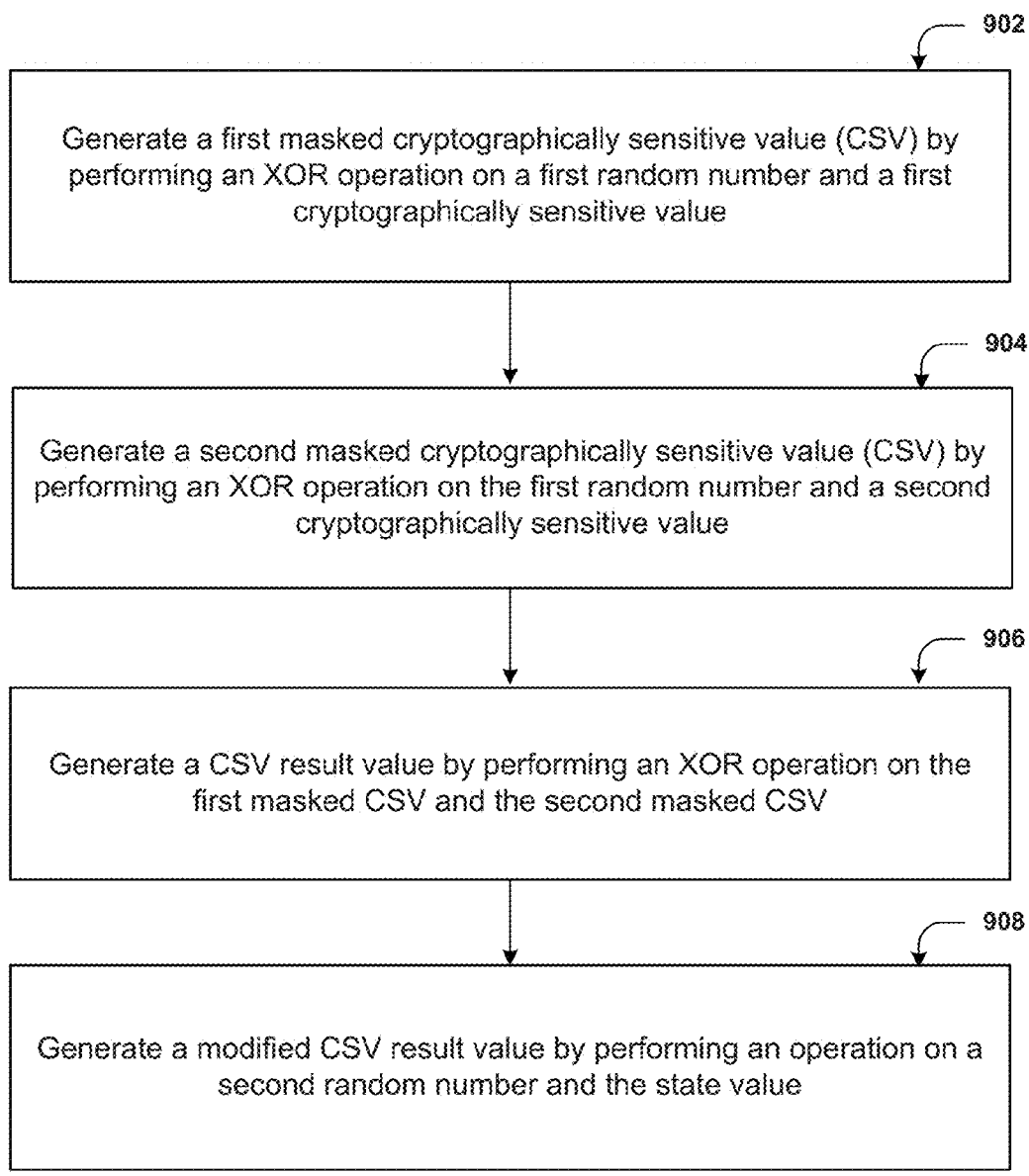

SYSTEMS AND METHODS FOR DYNAMIC DATA MASKING

BACKGROUND

Cryptographic algorithms implemented in hardware, software, or firmware for data processing often leak information about one or more keys used for cryptography. For example, power analysis, such as simple power analysis (SPA), differential power analysis (DPA), differential frequency analysis (DFA), or differential spectrogram analysis (DSA), can be used to extract one or more keys and thus expose the nominally protected data. These and other shortcomings of the prior art are addressed by the present disclosure.

SUMMARY

It is to be understood that both the following general description and the following detailed description are exemplary and explanatory only and are not restrictive. Methods and systems for dynamic data masking are disclosed. For example, the methods and systems can be used for dynamic data masking in cryptographic operations, such as advanced encryption standard (AES) encryption and/or decryption (E/D) operations, DES operations, or triple DES operations to prevent power analysis attacks. In an aspect, cryptographically sensitive values (CSVs) can be covered with unlimited and continuously changing masks. As an example, substitution tables, key schedules, and state registers in AES, DES, or triple DES operations can be covered with unlimited and constantly changing masks. In an aspect, dynamic data masking can be combined with an orbital RAM algorithm and a no-operation clocks algorithm to make power analysis attacks of cryptographic designs more difficult.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 8A is a flowchart illustrating an example method;

FIG. 8B is a flowchart continuing the example method illustrated in FIG. 8A;

FIG. 9 is a flowchart illustrating another example method; and

DETAILED DESCRIPTION

Figure 1:
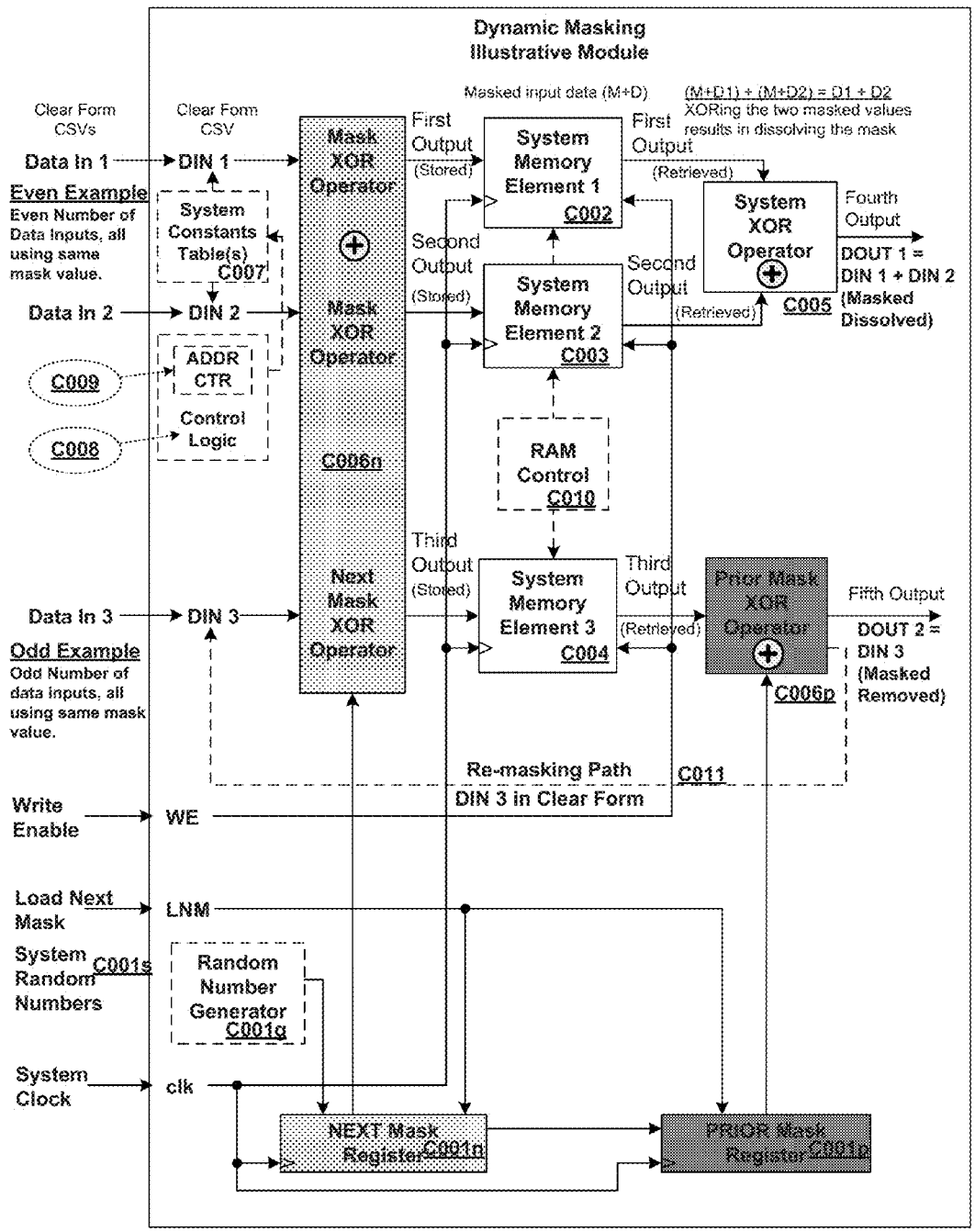
FIG. 1 is a block diagram illustrating an example process.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, flash memory internal or removable, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for dynamic data masking. For example, the disclosed methods and systems can be used for dynamic data masking in cryptographic operations, such as advanced encryption standard (AES) operations, data encryption standard (DES) operations, or triple DES operations to make power analysis attacks of cryptographic functions more difficult. In an aspect, cryptographic data can be covered with unlimited and continuously changing masks. As an example, one or more substitution tables, key schedules, and state registers in AES, or the key schedule and selection functions $S_1, S_2, \ldots S_8$ in a DES, or triple DES can be covered with unlimited and continuously changing masks. In an aspect, dynamic data masking can be combined with an orbital RAM algorithm and a no-operation clocks algorithm to prevent power analysis of cryptographic functions. In an aspect, the methods and systems described herein can be applied to the tables-based AES described in GLADMAN. B. 2007, "A specification for Rijndael, the AES algorithm (version 3.16)" (referred to herein as "Gladman") and in Federal Information Processing Standards Publication 197 (FIPS 197), both of which are incorporated herein by reference.

In an aspect, the disclosed methods and systems can be used to mask cryptographically sensitive values (e.g., CSV). As an example, a CSV can comprise intermediate results of a cryptographic calculation, fundamental calculation values, such as the contents of a substitution table, and the like. The purpose of applying masks on CSV is that information can be leaked when CSVs are stored or retrieved from memory elements due to the possible switching of an output stage of a memory element such as a RAM or Flip-Flop, which is a notable power consumption event. In an aspect, reading the CSV may result in a notable power consumption event. This occurs when RAM is read and is particularly sensitive to the power analysis attacks.

An example method can comprise generating a first output (e.g., substitution table entry covered with a first mask) by performing an operation (e.g., an XOR operation) on a first random number such as a first mask and a first data block (e.g., a fundamental calculation value such as Gladman table entry as initialized by an AES design). The first data block can comprise substitution (e.g., Gladman) table entries for substitution tables (e.g., four substitution tables) and stored (e.g., in four tables in a first RAM Bank) for later use in generating the second output. The set of masked substitution table entries for all four tables stored in the first RAM Bank can be collectively called the first output.

A second output (e.g., a column output of an AES E/D operation) can be generated by performing an operation (e.g., a substitution table lookup operation) on a second data block (e.g., the output of the AES ShiftRows or InvShiftRows function resulting in an array of four bytes selected from an AES State Register during an AES E/D operation) that retrieves correct first outputs from all four substitution tables in the AES E/D operation enabled RAM bank (e.g., the first RAM Bank after Gladman table values have been masked and written into the first RAM Bank) and performs an operation (e.g., an XOR operation) on all four substitution (e.g., Gladman) table outputs to create a column output value as described by Gladman during an AES E/D operation. In an aspect, when the number of masked values upon which the XOR operation is being performed is an even number (e.g., four), and all four masked values use a same mask (e.g., the first mask), the mask can be dissolved during the XOR operation of the four elements from the collection of first outputs (e.g., the Gladman substitution table outputs from the first RAM bank). This means there is no need for an additional XOR operation to remove the mask prior to an even number of values, which are all masked with the same value.

A third output, substitution (e.g., Gladman) tables covered with a second mask, can be generated by performing an operation on a second random number such as the second mask and the first data block. The first data block can comprise Gladman table entries for four substitution tables and stored (e.g., in four tables in a second RAM Bank) for later use in generating the fourth output. The masked Gladman table entries for four tables stored in the second RAM Bank can be collectively called the third output.

A fourth output (e.g., a column output during an AES E/D operation) can be generated by performing an operation (e.g., a substitution table lookup operation) on another instance of the second data block (e.g., the output of the AES ShiftRows or InvShiftRows function resulting in an array of four bytes selected from the AES State Register data during an AES E/D operation) that retrieves the correct third outputs from all four substitution (e.g., Gladman) tables in an AES E/D operation enabled RAM bank (e.g., the second RAM Bank after all substitution table values have been masked and written into the second RAM Bank) and performs an operation (e.g., an XOR operation) on all four substitution (e.g., Gladman) table outputs to create a column output value during an AES E/D operation as described by Gladman. The column output value can be called Substitution Table Input which for AES is the output of the AES ShiftRows or InvShiftRows function resulting in an array of four bytes selected from an AES State Register. When the number of masked values is an even number (e.g., four), and all four masked values use a same mask (e.g., the second mask), the mask can be dissolved during the XOR operation of the four elements from the collection of third outputs (e.g., the Gladman table outputs from the second RAM bank). Thus, there is no additional XOR operation to remove the mask prior to the even number of values, which are all masked with the same value, have the standard AES XOR operation as described in Gladman.

In an aspect, a fifth output can be generated by multiplexing the second output and the fourth output. In an aspect, the fifth output can be selected from the second output (e.g., column output from the first RAM bank previously covered with a prior mask) or the fourth output (e.g., column output from the second RAM bank previously covered with a next mask), based on a multiplexing process. For example, when the substitution tables in the first RAM bank that result in the second output are being generated (e.g., substitution tables are being covered with the first random number), the fifth output can be based on the fourth output. Similarly, when the substitution tables in the second RAM bank that result in the fourth output are being generated (e.g., substitution tables are being covered with the second random number), the fifth output can be based on the second output. In an aspect, the fifth output can be an intermediate cryptographic calculation result and can be valid independent of which RAM bank is being re-masked. The fifth output can be masked and saved in a memory as a sixth output. As an example, the sixth output (e.g., a masked AES column output) can be generated by performing an operation (e.g., an XOR operation) on a third random number, such as a third mask, and the fifth output. The fifth output can comprise one 32-bit word of four words, 128-bit AES State Array. In an aspect, the sixth output can be concatenated together to form the 128-bit contents of the AES state array just prior to the operation of the AES AddRoundKey function. The mask for these four instances of the sixth output are four, 32-bit portions of a single 128-bit mask.

In an aspect, the disclosed methods and systems can be used to mask a key schedule. For example, the first key in an AES key schedule can be the value of an input key, while the subsequent round keys can be calculated from the input key. In the example AES architecture being employed in this disclosure, the column registers, which are used to save the four instances of the sixth output during an AES encryption or decryption (E/D) operation, can be re-configured for the key expansion calculation before an AES E/D operation is performed using the input key. This can comprise 128, 192, 256 bit shift register that moves the four, 32-bit words by one-word when the shift occurs, while performing requisite transformation on each word as it is shifted. According to FIPS 197 specification, every fourth word of the key schedule undergoes a different data transformation, versus the other three intervening words, resulting in a next word of the key schedule. In an aspect, this transformation can be equal to the fifth output, with additional FIPS 197 base key expansion operations performed, when every fourth word of the key schedule is the input to the look-up table operation performed by substitution tables that produces the fifth output. Thus, the fifth output can also be used during a key expansion process to create a key schedule. As an example, a seventh output (e.g., a masked input key) can be generated by performing an operation (e.g., an XOR operation) on a fourth random number (e.g., a key mask) and a third data block (e.g., 128,192, 256 bit input key as initial round key). The 128-bit seventh output for rest of the key schedule (e.g. subsequent round keys) can be available after every four shifts of the 128-bit shift register with the appropriate word of the round key being routed to the substitution table transformation (e.g., look-up table) operation resulting in the fifth output, along with the other operations, as used during key expansion. When shifting the 128-bit round key by one word, each 32-bit portion of the key mask covering each 32-bit portion of the round key before the shift can be removed via an operation (e.g., an XOR operation), and the 32-bit portion of the key mask where that 32-bit portion of the round key can be placed after the shift must be placed onto that portion of the round key via an operation (e.g., an XOR operation). This can be performed for each word of the four key-mask—round-key word pairs during calculation of each 128-bit round key. Furthermore, this process can continue until all the round keys of the expanded key schedule for this input key have been calculated. The seventh output, whether from an initial or one or more subsequent rounds of key schedule expansion operation, can be stored in memory for later use during and AES E/D operation. Additionally, if the third mask and the key mask are not equal in value, each of these two masks would have to be removed individually, which would require two additional XOR operations. However, by making the third mask and the key mask equal in value, the AES AddRoundKey function (e.g., an XOR operation performed later) can be performed on the masked contents of the AES state array just prior to the AES AddRoundKey function and the masked AES round key directly. The mask can be dissolved in the AES AddRoundKey XOR operation because there are an even number of values, in this case two, which can be both masked with a same value.

An eighth output (e.g., masked input data) can be generated by performing an operation on the fourth random number (e.g., the key mask) and a fourth data block (e.g., input data). A ninth output (e.g., masked AES state array contents just prior to the AES AddRoundKey transformation) can be generated by performing an operation (e.g., a multiplexor operation) that selects between the eighth output (e.g., the initial round using masked input data) or the sixth output (e.g., the subsequent rounds using masked column outputs) as the operation inputs. This ninth output can be the correctly selected data path output in masked form as a function of the round count (e.g., initial or subsequent rounds) and become an input to the AES AddRoundKey function. A tenth output (e.g., the contents of the AES state array at the end of initial or subsequent rounds in clear form just after the AddRoundKey transformation) can be generated by performing an operation (e.g., the AddRoundKey function) on the retrieved seventh output and the ninth output. The tenth output can be the AES state array after the round key is applied in clear form. The tenth output can be utilized in a subsequent cryptographic operation. In an aspect, the tenth output can be masked by a state register mask before being stored in the state register.

In an aspect, the disclosed methods and systems can be used to mask a state register. As an example, an eleventh output (e.g., masked AES state array data) can be generated by performing an XOR operation on a fifth random number (e.g., a state register mask) and the tenth output The eleventh output can then be stored in the state register. The fifth random number can be a state register mask, and the eleventh output can be a masked tenth output (e.g., masked AES state register). In an aspect, the fifth random number can be generated by a random number generator and saved in a state register mask database. After the fifth random number is used to cover the tenth output, the fifth random number can be saved in a prior state register mask database. Therefore, when the tenth output is needed for a subsequent cryptographic operation, an XOR operation can be performed on the eleventh output, and the fifth random number can be saved in the prior state register mask database. The XOR operation can remove, as opposed to dissolve, since this is an odd number of values—masked the fifth random number (e.g., a state register mask) to obtain the tenth output (e.g., AES state register contents in clear form).

In an aspect, masks (e.g., random numbers) for cryptographic operations (e.g., substitution tables, key schedule, state register) can change constantly, wherein each mask can be used for a short period of time (e.g., the duration of one to four AES E/D operations). Moreover, the number of masks used can be unlimited. As a result, the possibility of capturing enough samples needed for power analysis attacks of a cryptographic function can be greatly reduced or even eliminated.

It should be noted that the disclosed methods and systems can be independent of a specific cryptographic algorithm. For example, the present disclosure can be applied to any cryptographic algorithm such as AES, DES, and triple-DES, wherein repetitive substitutions can be performed via a look-up table as part of the cryptographic algorithm. Software or firmware implementations of cryptography algorithms can also benefit from the methods and systems disclosed herein. The present disclosure is not limited thereto and is equally applicable to other functions or applications that are at risk of leaking information if subjected to a power analysis attack Application of the dynamic data masking methods will be readily apparent to those skilled in the art from the description provided herein. The architecture of a system implementation can vary according to a specific cryptographic algorithm.

FIG. 1 is a block diagram illustrating dynamic masking according to the present methods and systems. The dashed lines reflect functions, logic and-or connections that may or may not vary to accommodate the needs of a specific design. As an example, the dashed lines are used for the random number generator C001g, which is not required if there is a source C001s of sufficiently random numbers available from the system to which the dynamic masking is being applied. However, independent of the source of the random numbers, the random number used to mask the CSVs can be stored in a next mask register C001n, shown in solid lines. Furthermore, each time a new next mask is stored, a previous mask can be transferred to the prior mask register C001p, also shown in solid lines. The system can comprise instances where a candidate design to which this disclosure can be applied includes an operation (e.g., an XOR operation) on an even number of data elements, such as shown for output DOUT 1. This is referred to as the Even Example throughout this disclosure. However, if the values are CSVs that are being stored or retrieved from system memory and are not masked, it is possible that information about those values can be leaked via the power required to switch the output state of a memory element when storing or retrieving those values. Therefore, a first output can be generated by performing an operation (e.g., an XOR operation) on a first random number and DIN 1. A second output can be generated by performing an operation (e.g., an XOR operation) on the same first random number and DIN 2. The first output can be stored in system memory element 1 C002, and the second output can be stored in system memory element 2 C003. To create the DOUT 1 output, an operation (e.g., XOR operation that would occur on the retrieved copies of DIN 1 and DIN 2 even if dynamic masking was not being applied to the design) on the retrieved copies of the first and second outputs. When doing so, the mask value on both numbers can be dissolved by the operation and the fourth output labeled DOUT 1 is the same result as when dynamic masking was not being applied. The term dissolved refers to the fact that there is not an addition operation (e.g., an additional XOR operation) required to remove the mask value from the DIN 1 and DIN 2 inputs before the operation is performed. In another aspect, the system can comprise instances where the system design requires storing in a memory element (e.g., System Memory Element 3) an odd number of data elements, such as shown for output DOUT 2. This is referred to as the Odd Example throughout this disclosure. However, if the value is a CSV that is being stored or retrieved from system memory is not masked, it is possible that information about this value can be leaked via the power required to switch the output state of a memory element when storing or retrieving that value. Therefore, a third output can be generated by performing an operation (e.g., an XOR operation) on a second random number from next mask register C001n and DIN 3, then storing the result in system memory element 3 C003. To create the fifth output labeled DOUT 2 output, an operation (e.g., an XOR operation that would not have occurred on the retrieved copy of DIN 3 if dynamic masking was not being applied to the design) can be performed on the retrieved copy of the third output and a random number from prior mask register C001p. In this case, the mask value on the retrieved copy of the third output can be removed in prior mask operation C006p, as opposed to being dissolved, by this additional operation on the retrieved copy of the third output. Once the mask is removed, DOUT 2 is the same result as when dynamic masking was not being applied. The term removed refers to the fact that there is an addition operation (e.g., an additional XOR operation) required to remove the mask value from the DIN 3 input as compared to the system design without dynamic masking being applied. The random numbers selected for masking can be stored in next mask register C001n and transferred to prior mask register C001p each time a Load Next Mask input is active. When the CSV is written to a system memory element an input write enable signal for that system memory element can be connected to the load next mask input. In another aspect, a write enable signal may be generated by a dynamic masking module such as when system constants tables C007 are being masked by control logic C008 or RAM control C010, and written at the location pointed to by address counter C009 or RAM control C010 to system memory elements C002, C003 or C004 that may, for example, be configured for a look-up table operation during normal system operation. Re-masking the contents of system memory element C003, for example, when it contains the masked contents of such system constant tables as in C007, there is no need to remove the prior mask from the contents of system memory element C003 before applying a new mask. This is because the original contents from C007 are the source data to each re-masking operation so the prior contents of C003 are no longer needed.

A brief description of each module of FIG. 1 is illustrated in Table 1.

retrieved from system memory elements without any additional changes. From the specification for a candidate design to which this disclosure is being applied, there is a DOUT 1, labeled fourth output in FIG. 1, that is defined as DOUT1=D1+D2. When the mask is applied, this becomes DOUT 1=(retrieved first output)+(retrieved second output),

TABLE 1

| Item | Function Name | Reference | Description |
|---|---|---|---|
| a. | random number generator | C001g | Creates random numbers for dynamic masking as part of the additional functions, logic, or connections associated with the application of this disclosure to the candidate design. |
| b. | system random numbers | C001s | Receives random numbers for dynamic masking from a candidate design such that there is no need to include the random number generator in the additional functions, logic, or connections associated with the application of this disclosure. |
| c. | next mask register | C001n | When loaded via the load next mask signal being active, this register stores the value of the mask that will be applied to a next data item or data block. |
| d. | prior mask register | C001p | When loaded via the load next mask signal being active, this register stores the previous mask value that has been applied to all the data items or data blocks for which it was used. In the Odd Example, this register is used in removing a mask when necessary. |
| e. | next mask operator or mask operator | C006n | The first, second or third outputs can be generated by this operator performing an operation (e.g., an XOR operation) on a mask in the next mask register and input data blocks. |
| f. | system operator | C005 | A suitable operation that is present in a candidate design independent of the application of this disclosure. |
| g. | prior mask operator | C006p | The DOUT 2 output is generated by this operator performing an operation (e.g., an XOR, operation) on the on a mask in the prior mask register and a retrieved third output. |
| h. | system memory element 1 | C002 | Memory elements that are present in a candidate design independent of the application of this disclosure. |
| i. | system memory element 2 | C003 | Memory elements that may replicate some memories present in a candidate design before the application of this disclosure, particularly for system fundamental calculation values such as constants in a substitution table. |
| j. | system memory element 3 | C004 | Memory elements that are present in the candidate design independent of the application of this disclosure, but have neither data element with which to pair or appropriate system operator to dissolve the mask. |
| k. | system constants table(s) | C007 | These tables contain constants such as look-up table entries as initialized by the candidate design to which this disclosure can be applied. |
| l. | system constants tables control logic | C008 | This logic is used to drive an address counter used in masking or re-masking the contents of a system memory element containing RAM. |
| m. | address counter | C009 | Address counter used in initializing and masking the contents of a system memory element containing RAM. |
| n. | RAM control logic | C010 | Address counter used in re-masking the contents of a system memory element containing RAM. |
| o. | re-masking path | C011 | Data routing path when an Odd Example is used with a re-masking function to provide continuously changing masks. |

Additionally, FIG. 1 shows Re-masking Path C011 from DOUT 2 to DIN 3. For example, in an aspect, system memory element 3 C004 can be a RAM containing previously masked CSVs. Employing RAM Control C010 to provide read/write addresses and control signals, the contents of C010 can be read then un-masked by prior mask operator C006p using the prior mask as stored in prior mask register C001p, which was transferred to C001p from next mask register C001n after the last write of the masked data of the third output into system memory element 3 C004 when it was masked by next mask operator C006n using the mask value stored in from next mask register C001n when the masking of this data block occurred. In an aspect, the dynamic masking shown in FIG. 1 can be applied to system constants. Mathematically, the first output is Mn+D1 where + denotes the XOR operation. The second output is Mn+D2. Both the first and second outputs can be stored in and or the mathematically equivalent (Mn+D1)+(Mn+D2)=(Mn+Mn)+(D1+D2). Because Mn+Mn=0, this reduces to simply D1+D2, which is the same as the original system specification of the candidate design for DOUT 1. Thus for the Even Example, there is no additional operation required to remove the mask from the two data elements for the case where the system specification includes an XOR operation as part of the original design without dynamic masking being applied. In an aspect, an application with a single system memory element as in the Odd Example in FIG. 1 can be converted to an Even Example implementation. The advantage is that Prior Mask C001p would not be required to recover the original data in clear form. In an aspect, it can be particularly useful in dynamically masking RAM elements. In this case, referring to the system XOR operator C005 in the Even Example, it would instead be an added XOR function as part of the Dynamic Data Masking logic.

Additionally, the data content (e.g., CSVs) of what was system memory element 3 C004 would be apportioned between two memory elements C002 and C003. For example, in this case system memory element 1 C002 would still be a system memory element, but system memory element 2 C003 would instead be an added memory element as part of the Dynamic Data Masking logic. In an aspect, the data content can then be apportioned between two memory elements. For example, if applying the Odd Example from FIG. 1 would require storing the value 0x36, then converting it to an Even Example implementation can consist of storing the upper nibble 0x3 in one memory (e.g., Memory 1 in) as 0x30, and storing a lower nibble in the other memory element (e.g., Memory 2 in) as 0x06, while maintaining the original bit assignments. In an aspect, when retrieving the data, two values can have an operation (e.g., XOR operation) performed on the retrieved results such that the output data Dout is as follows:

Dout=(Memory 1 out)+(Memory 2 out) or Dout=0x30+0x06=0x36, where + denotes the XOR operation. The data can be apportioned in any combination of bits, nibbles, bytes, and words, etcetera desired while filling unassigned bits in each memory with 0's. In an aspect, (Memory 1 out) and (Memory 2 out) can then be masked by performing an operation (e.g., an XOR operation) with a mask of the same value applied to each. For example, if the mask value M of 0xC9 were applied to each value before it was stored, the Memory 1 in and Memory 2 in equations would become as follows:

Memory 1 in=[$M$+(Memory 1 in)] and Memory 2 in=[$M$+(Memory 2 in)] or

Memory 1 in=[0xC9+(0x30)] and Memory 2 in=[0xC9+(0x06)] or

Memory 1 in=0xF9 and Memory 2 in=0xCF.

Dout equation would become as follows:

Dout=(Memory 1 out)+(Memory 2 out) or

Dout=(0xF9)+(0xCF) or Dout=0x36, because $M+M=0$, leaving the original data intact. Applications where multiply operations are used, especially if repeated numerous times during a cryptographic operation such as an RSA or elliptical curve calculation resulting in many intermediate CSVs, can benefit from protection against power analysis attacks that dynamic data masking as described herein.

Figure 2A:
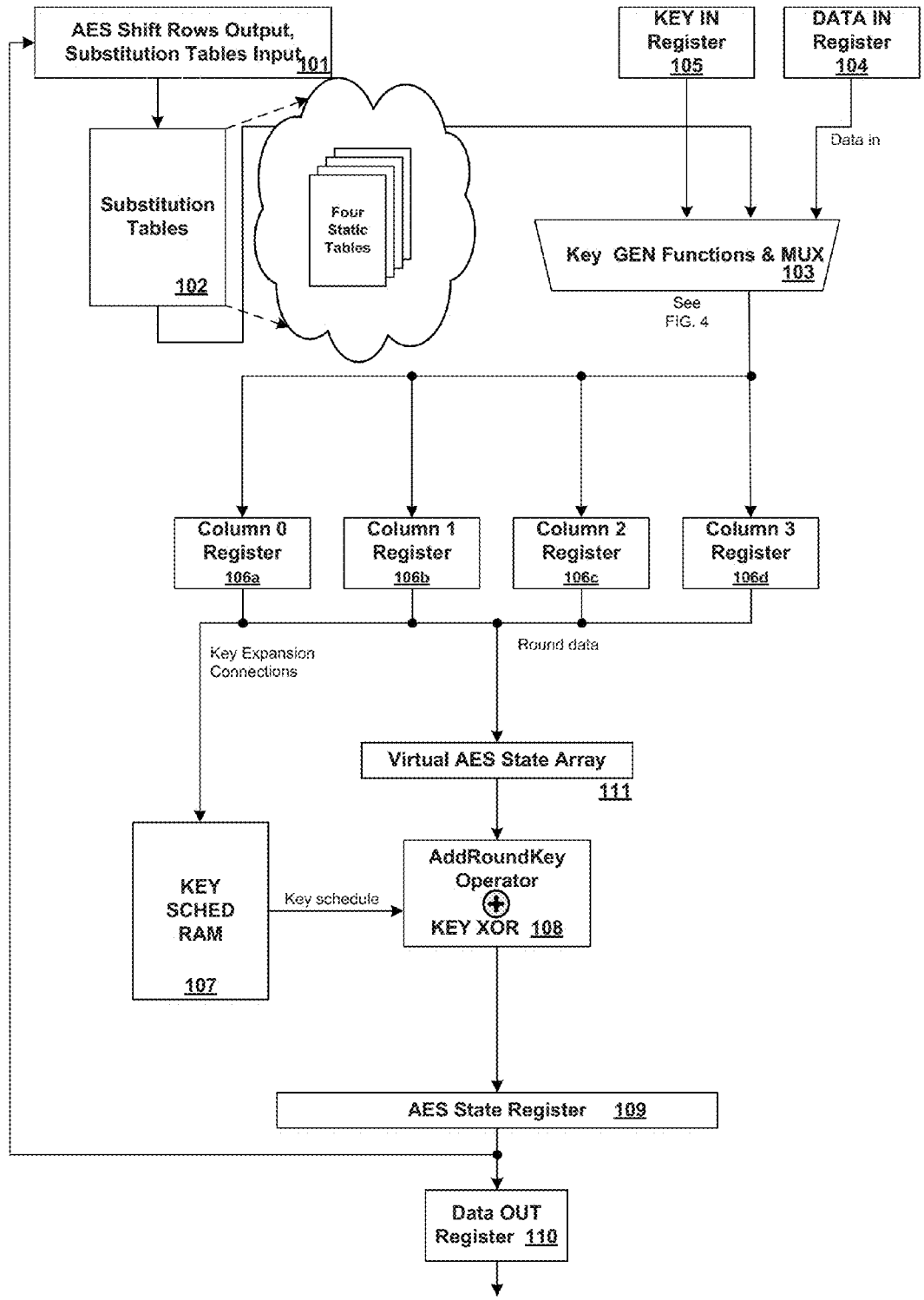
FIG. 2A is a block diagram illustrating various components of an exemplary method.

FIG. 2A is a block diagram illustrating an exemplary tables-based AES configuration. Dynamic data masking are not shown in FIG. 2A. FIG. 2A illustrates how the dynamic data masking methods and systems can be applied. The system can comprise substitution table input 101, Substitution tables 102 (e.g., dynamic masking substitution tables), key generation functions 103, input data register 104, key in register 105, column 0 register 106a, column 1 register 106b, column 2 register 106c, column 3 register 106d, key schedule RAM 107, AES AddRoundKey XOR operator 108, AES state register 109, data out register 110, and virtual AES state array 111. A description for each function module in FIG. 2A is shown in Table 2.

A brief description of each module of FIG. 2A is illustrated in Table 2.

TABLE 2

| Item | Function Name | Description |
| --- | --- | --- |
| 101 | substitution table input | Four bytes from AES state register selected via the AES ShiftRows or InvShiftRows function, forming a single AES column as inputs for the Substitution (Gladman) Tables. |
| 102 | Substitution Tables (FIG. 2A) or dynamic masking Substitution tables (FIG. 2B) | Substitution (Gladman AES) Tables without dynamic masking (FIG. 2A), and with the dynamic masking applied (FIG. 2B) as described herein. |
| 103 | key generation functions | AES key schedule calculation logic, performed in a time domain multiplexed use of the Substitution (Gladman) Tables and the column 0 through column 4 registers. |
| 104 | input data register | The standard AES input data block. |
| 105 | key in register | The standard AES input cipher key. |
| 106a | column 0 register | For this particular AES implementation, one column at a time can he processed until all four columns are complete. This column register is the left most column of AES state array, just prior to the operation with the key schedule. |
| 106b | column 1 register | The second of four AES columns processed in generating the AES state array just prior to the operation with the key schedule. |
| 106c | column 2 register | The third of four AES columns processed in generating the AES state array just prior to the operation with the key schedule. |
| 106d | column 3 register | The fourth of four AES columns processed in generating the AES state array just prior to the operation with the key schedule. |
| 107 | key schedule RAM | For this particular AES implementation, the results of the key expansion process for the input cipher key can be generated and are stored in this RAM before the AES data operation begins, |
| 108 | AES AddRoundKey XOR operator | For this particular AES implementation, this is the standard AES XOR operation to apply the key schedule to the AES state array before storing results in the AES state register. |
| 109 | AES state register | The standard AES state register as described in FIPS 197 or Gladman |

TABLE 2-continued

| Item | Function Name | Description |
|---|---|---|
| 110 | data output register | The resulting data block of the AES E/D operation using the input cipher key on the input data block. This is a standard AES output. |
| 111 | Virtual AES state register | comprise intermediate AES data (e.g., column 0 register 106a, column 1 register 106b, column 2 register 106c, column 3 register 106d) |

Figure 2B:
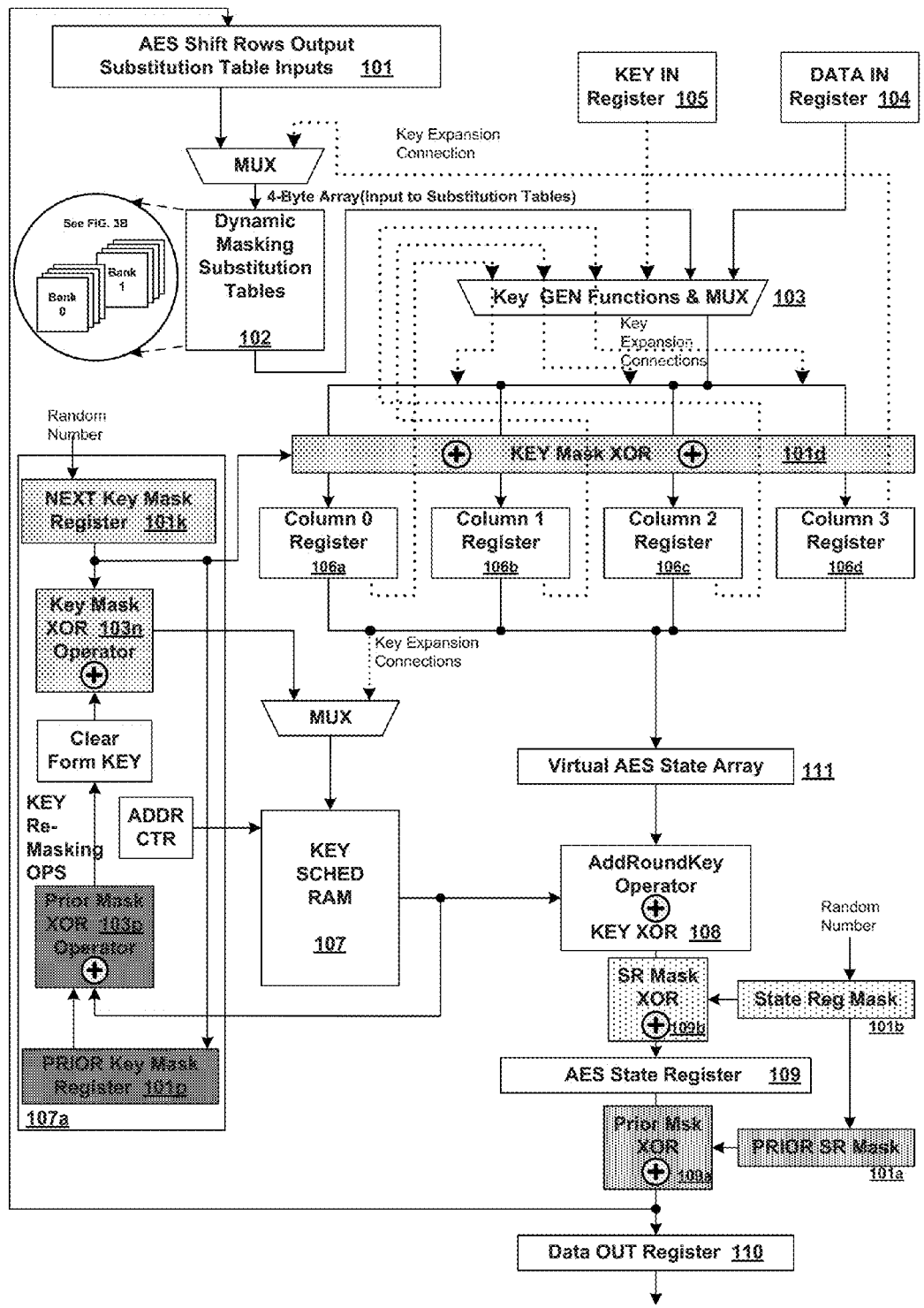
FIG. 2B is a block diagram illustrating various components of an exemplary system.

FIG. 2B is a block diagram illustrating various components of an exemplary AES design applied with dynamic masking of an exemplary AES design. In an aspect, FIG. 2B illustrates key expansion, or key schedule generation, connections in dotted lines. Substitution tables 102 in FIG. 2A are changed to dynamic masking substitution tables in FIG. 2B. FIG. 2B also adds key mask XOR operator 101d, State Register Mask 101b, prior state register mask 101a, key re-masking operations 107a, prior key mask register 101p, prior mask XOR operator 103p, key mask XOR operator 103n, next key mask register 101k, address counter ADDR_CTR in 107a.

A brief description of each module of FIG. 2B is illustrated in Table 3.

TABLE 3

| Item | Function Name | Description |
|---|---|---|
| 101d | key mask XOR | XOR operator stii with a bit length equal to the bit length of the input key 105. |
| 101a | Prior SR mask | Mask used on the state register input when it was most recently stored. |
| 101b | state register mask | Mask used on the state register input the next time it will be stored. |
| 107a | key re-masking operations | This block contains most the logic added to the candidate design to implement the masking of the input key and expanded key schedule. |
| 101p | prior key mask XOR register | Mask used on the expanded key schedule when it was most recently stored. |
| 103p | prior mask XOR operator | Operator that removes the prior mask from the expanded key schedule. |
| 103n | key mask XOR register | Mask used on the expanded key schedule the next time it will be stored |
| 101k | next key mask XOR register | Operator that applies the next key mask to the expanded key schedule |
| ADDR_CTR | address counter | Address counter in the key re-masking operations 107a. |
| 109a | prior mask XOR | Operator that removes the prior mask from the state register the last time it was written. |
| 109b | SR mask operator | Operator that applies the next SR mask to the state register the next time is written. |

Figure 2C:
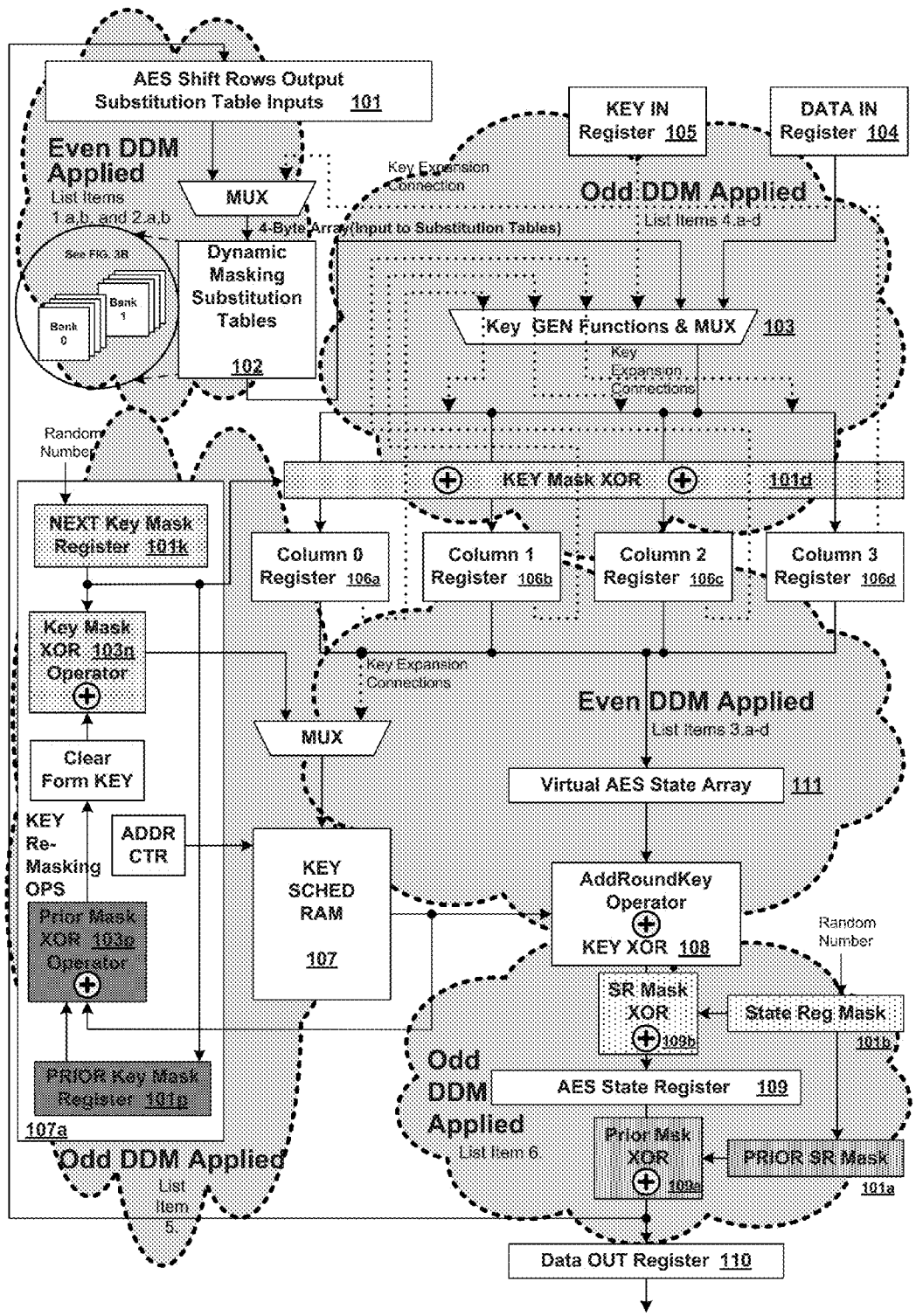
FIG. 2C is a block diagram illustrating various components of an exemplary system.

FIG. 2C is a block diagram illustrating various components of an exemplary AES design applied with even dynamic data masking and odd dynamic data masking. A list of the odd and even examples is described below and summarized in Table 4. It should be noted that elements in FIG. 1 that are not listed in Table 4 are not part of that portion of the exemplary AES where that Odd or Even Example is being applied.

1. Substitution tables masking and re-masking operations shown as two instances for each bank of the write portion of an even example. An exemplary AES performs the substitution table masking operation as a 128-Bit input concatenated from Table A, B, C. D outputs, with each 32-bit portion using the same mask value.
   a. Bank 0 dual-port RAMs 102a, Tables 1, 2, 3, and 4 (two instances);
   b. Bank 1 dual-port RAMs 102b, Tables 5, 6, 7, and 8 (two instances);
2. Substitution tables look-up operation shown as two instances for each bank of the read portion of an even example:
   a. Bank 0 dual-port RAMs 102a, Tables 1, 2, 3, and 4 (two instances);
   b. Bank 1 dual-port RAMs 102b, Tables 5, 6, 7, and 8 (two instances);
3. Add round-key operation applying an Even Example:
   a. Performing write portion of an Even Example while masking the key schedule RAM contents;
   b. Performing write portion of an Even Example while masking the column register contents;
   c. Performing read portion of an Even Example on masked virtual AES state array (formed by concatenating the column register outputs) and a masked key schedule on a per-AES round basis;
4. Column register masking during sub-operations of key expansion function employing four instances of an Odd Example. Shift register operations for each word of the key schedule can be performed as it is generated and stored in 106a-106d. Therefore, there is one instance of the Odd Example for each stage as described in the 4.a through 4.d below. Referring to FIG. 2C (or without shading in FIG. 4), the stages are as follows:
   a. Stage 1: From Substitution Tables 102, as routed through Key GEN Functions and MUX, 103 and KEY Mask XOR operator 101d, to Column Register 0, 106a, b. Stage 2: From Column Register 0, 106a, as routed through Key GEN Functions and MUX, 103 and KEY Mask XOR operator 101d, to Column Register 1. 106b, c. Stage 3: From Column Register 1, 106b, as routed through Key GEN Functions and MUX, 103 and KEY Mask XOR operator 101d, to Column Register 2, 106c.

d. Stage 4: From Column Register 2, 106c, as routed through Key GEN Functions and MUX, 103 and KEY Mask XOR operator 101d, to Column Register 3, 106d;

When all four column registers contain a newly generated set of four masked key schedule words, the key schedule words can be stored in masked form in Key Schedule RAM, 107 for later use in data operation.

5. Key schedule re-masking Odd Example. The starting point of a re-masking operation can be the masked elements in the FIG. 1, System Memory Element, C004, or in this case, the masked key schedule entries in FIG. 2C Key Schedule RAM, 107.

6. State register masking Odd example.

TABLE 4

| Table 4 List Item | Reference FIG. 1 | Applied FIG. & Ref. Des. FIG. | Ref. Des. | Comments |
|---|---|---|---|---|
| 1.a | | Substitution tables masking | | operations, write portion of the Even Example, Bank 0, 102a |
| 1.a | C007 | 3B | 102s Tbl A | System Constants Table, 1 of 4, $1^{st}$ instance. |
| | C007 | | 102s Tbl B | System Constants Table, 2 of 4, $1^{st}$ instance. |
| | C007 | | 102s Tbl C | System Constants Table, 3 of 4, $2^{nd}$ instance. |
| | C007 | | 102s Tbl D | System Constants Table, 4 of 4, $2^{nd}$ instance. |
| | DIN 1 | | Tbl A Out | $1^{st}$ 32-bit portion of 102m Input from Table A, $1^{st}$ instance. |
| | DIN 2 | | Tbl B Out | $2^{nd}$ 32-bit portion of 102m Input from Table B, $1^{st}$ instance. |
| | DIN 1 | | Tbl C Out | $3^{rd}$ 32-bit portion of 102m Input from Table C, $2^{nd}$ instance. |
| | DIN 2 | | Tbl D Out | $4^{th}$ 32-bit portion of 102m Input from Table D, $2^{nd}$ instance. |
| | C001n | | 101n | 32-bit register matching data width of Tables A-D. |
| | C006n | | 102m-XOR | Same 32-bit mask value used on DIN 1 and DIN 2 each time. |
| | C008 | | 102m | 102m control logic (this row) and address counter (next row). |
| | C009 | | 102m-AC | ADDR CTR C009 and RAM Control C010 are the same |
| | C010 | | 102m-AC | component in this application (e.g. Address Counter in 102m). |
| | $1^{st}$ Output | | $1^{st}$ Output | $1^{st}$ & $3^{rd}$ of 4 masked words (e.g. Tables A, C) are stored. |
| | $2^{nd}$ Output | | $1^{st}$ Output | $2^{nd}$ & $4^{th}$ of 4masked words (e.g. Tables B, D) are stored. |
| | C002 | | 102a Tbl 1 | Masked System Constants Table, 1 of 4, Bank 0, $1^{st}$ instance. |
| | C003 | | 102a Tbl 2 | Masked System Constants Table, 2 of 4, Bank 0, $1^{st}$ instance. |
| | C002 | | 102a Tbl 3 | Masked System Constants Table, 3 of 4, Bank 0, $2^{nd}$ instance. |
| | C003 | | 102a Tbl 4 | Masked System Constants Table, 4 of 4, Bank 0, $2^{nd}$ instance. |
| 1.b | | Substitution tables masking | | operations write portion of the Even Example, Bank 1, 102b |
| 1.b | C007 | 3B | 102s Tbl A | System Constants Table, 1 of 4, $1^{st}$ instance. |
| | C007 | | 102s Tbl B | System Constants Table, 2 of 4, $1^{st}$ instance. |
| | C007 | | 102s Tbl C | System Constants Table, 3 of 4, $2^{nd}$ instance. |
| | C007 | | 102s Tbl D | System Constants Table, 4 of 4, $2^{nd}$ instance. |
| | DIN 1 | | Tbl A Out | $1^{st}$ 32-bit portion of 102m Input from Table A, $1^{st}$ instance. |
| | DIN 2 | | Tbl B Out | $2^{nd}$ 32-bit portion of 102m Input from Table B, $1^{st}$ instance. |
| | DIN 1 | | Tbl C Out | $3^{rd}$ 32-bit portion of 102m Input from Table C, $2^{nd}$ instance. |
| | DIN 2 | | Tbl D Out | $4^{th}$ 32-bit portion of 102m Input from Table D, $2^{nd}$ instance. |
| | C001n | | 101n | 32-bit register matching data width of Tables A-D. |
| | C006n | | 102m-XOR | Same 32-bit mask value used on DIN 1 and DIN 2 each time. |
| | C008 | | 102m | 102m control logic (this row) and address counter (next row), |
| | C009 | | 102m-AC | ADDR CTR C009 and RAM Control C010 are the same |
| | C010 | | 102m-AC | component in this application (e.g. Address Counter in 102m). |
| | $1^{st}$ Output | | $3^{rd}$ Output | $1^{st}$ & $3^{rd}$ of 4 masked words (e.g. Tables A, C) are stored. |
| | $2^{nd}$ Output | | $3^{rd}$ Output | $2^{nd}$ & $4^{th}$ of 4masked words (e.g. Tables B, D) are stored. |
| | C002 | | 102b Tbl 5 | Masked System Constants Table, 1 of 4, Bank 1, $1^{st}$ instance. |
| | C003 | | 102b Tbl 6 | Masked System Constants Table, 2 of 4, Bank 1, $1^{st}$ instance. |
| | C002 | | 102b Tbl 7 | Masked System Constants Table, 3 of 4, Bank 1, $2^{nd}$ instance. |
| | C003 | | 102b Tbl 8 | Masked System Constants Table, 4 of 4, Bank 1, $2^{nd}$ instance. |
| 2.a | | Substitution tables look-up | | operation read portion of the Even Example, Bank 0, 102a |
| 2.a | C010 | 3B | 101 | C010 is lookup table input for C002/C003, as is 101 to 102a. |
| | C002 | | 102a Tbl 1 | Masked System Constants Table 1 of 4 in Bank 0, $1^{st}$ instance. |
| | C003 | | 102a Tbl 2 | Masked System Constants Table 2 of 4 in Bank 0, $1^{st}$ instance. |
| | C002 | | 102a Tbl 3 | Masked System Constants Table 3 of 4 in Bank 0, $2^{nd}$ instance. |
| | C003 | | 102a Tbl 4 | Masked System Constants Table 4 of 4 in Bank 0, $2^{nd}$ instance. |
| | $1^{st}$ Output | | $1^{st}$ Output | Retrieved $1^{st}$ & $3^{rd}$ of 4 masked words (Bank 0 Tables 1, 3). |
| | $2^{nd}$ Output | | $1^{st}$ Output | Retrieved $2^{nd}$ & $4^{th}$ of 4 masked words (Bank 0 Tables 2, 4). |
| | C005 | | 4-in XOR | 4-input XOR between Bank 0 dual-port RAMs 102a and Multiplexor 102c |
| | DOUT 1 | | $2^{nd}$ Output | The output of the 4-in XOR connecting to Multiplexor 102c. |

TABLE 4-continued

| Table 4 List Item | Reference FIG. 1 | Applied FIG. & Ref. Des. FIG. | Ref. Des. | Comments |
|---|---|---|---|---|
| 2.b | | Substitution tables look-up operation read portion of the Even Example, Bank 1, 102b | | |
| 2.b | C010 | 3B | 101 | C010 is lookup table input for C002/C003, as is 101 to 102b. |
| | C002 | | 102b Tbl 5 | Masked System Constants Table 5 of 4 in Bank 1, $1^{st}$ instance. |
| | C003 | | 102b Tbl 6 | Masked System Constants Table 6 of 4 in Bank 1, $1^{st}$ instance. |
| | C002 | | 102b Tbl 7 | Masked System Constants Table 7 of 4 in Bank 1, $2^{nd}$ instance. |
| | C003 | | 102b Tbl 8 | Masked System Constants Table 8 of 4 in Bank 1, $2^{nd}$ instance. |
| | $1^{st}$ Output | | $3^{rd}$ Output | Retrieved $1^{st}$ & $3^{rd}$ of 4 masked words (Bank 1 Tables 5, 7). |
| | $2^{nd}$ Output | | $3^{rd}$ Output | Retrieved $2^{nd}$ & $4^{th}$ of 4 masked words (Bank 1 Tables 6, 8). |
| | C005 | | 4-in XOR | 4-input XOR between Bank 1 102b and Multiplexor 102c |
| | DOUT 1 | | $4^{th}$ Output | The output of the 4-in XOR connecting to Multiplexor 102c. |
| 3.a | | Masking key schedule RAM, ware portion of Even Example for Add round-key operation. | | |
| 3.a | DIN 1 | 2C | 102 Output | 4 instances, 1 per column register for each key schedule item. |
| | DIN 2 | | See 3.b | |
| | C001n | | 101k | Mask set before key expansion begins and held until complete. |
| | C006n | | 101d | See item 4 for masking column registers during key expansion. |
| | $1^{st}$ Output | | 107 Input | Masked key schedule item from 106a-d through MUX to 107 |
| | C002 | | 107 | Masked key schedule items generated & stored; 128-bits each. |
| 3.b | | Masking column registers, write portion of Even Example for Add round-key operation | | |
| 3.b | DIN 1 | 2C | See 3.a | |
| | DIN 2 | | 102 Out | 4 instances, 1 per column register for each AES round. |
| | C001n | | 101k | Associated portion of 128-bit mask per column register. |
| | C006n | | 101d | |
| | $2^{nd}$ Output | | 101d Output | Mask set before data operation begins and held until complete. |
| | C003 | | 106a | Column 0, $1^{st}$ 32-bits of 128-bit data generated & stored. |
| | C003 | | 106b | Column 1, $2^{nd}$ 32-bits of 128-bit data generated & stored. |
| | C003 | | 106c | Column 2, $3^{rd}$ 32-bits of 128-bit data generated & stored. |
| | C003 | | 106d | Column 3, $4^{th}$ 32-bits of 128-bit data generated & stored. |
| 3.c | | Add round-key operation on previously masked elements, read portion of the Even Example | | |
| 3.c | C002 | 2C | 107 | Masked key schedule items, 128-bits each, for add round key. |
| | C003 | | 106a | Masked data, 1 AES column output, $1^{st}$ 32 of 128 bit data. |
| | C003 | | 106b | Masked data, 1 AES column output, $2^{nd}$ 32 of 128 bit data. |
| | C003 | | 106c | Masked data, 1 AES column output, $3^{rd}$ 32 of 128 bit data. |
| | C003 | | 106d | Masked data, 1 AES column output, $4^{th}$ 32 of 128 bit data. |
| | $1^{st}$ Output | | 107 Output | Retrieved round key for add round-key operation. |
| | $2^{nd}$ Output | | 106a-d Out | Retrieved round data for add round-key operation. |
| | C005 | | 108 | Add round-key performed after 4 all 4 columns stored. |
| | DOUT 1 | | 108-Out | Output from two inputs with equal masks; mask is dissolved. |
| 4.a | | Column register masking during sub-operations of the key expansion function, Odd Example. | | |
| 4.a | | Stage 1 Employing Instance 1 of 4 of the Odd Example. | | |
| | DIN 3 | 2C and 4 | 102 Output | Output of 102 as routed through Key GEN/MUX 103. |
| | C001n | | 101k | Mask set before key expansion begins and held until complete. |
| | C006n | | 101d | $1^{st}$ 32-bit portion of mask for stage 1 of 128-bit shift register. |
| | $3^{rd}$ Output | | 101d Out | Storing 101d 32-bit word as connected to 106a (Solid line). |
| | C004 | | 106a | Stage 1 of 128-bit shift register shifting by 32-bits. |
| | $3^{rd}$ Output | | 106a Out | Retrieving 101d Output from 106a (Dotted line). |
| | C001p | | 101k | During key expansion, prior mask is 32-bit portion of 128-bit mask used on the column register currently being shifted. |
| | C006p | | 101d | $1^{st}$ 32-bit portion of mask for stage 1 of 128-hit shift register. |
| | DOUT 2 | | 101d Output | 106a Output after 32-bit portion of mask is removed by 101d. |
| | C011, Re-masking Path | | 106a-101d | From 106a (Dotted line output) upward through 101d (indicating removal of $1^{st}$ stage mask), routed by 103 to 101d input (Dotted line with ending arrow above 106b, the $2^{nd}$ stage of 128-bit shift register). |
| 4.b | | Stage 2 Employing Instance 2 of 4 of the Odd Example. | | |
| 4.b | DIN 3 | 2C and 4 | 103 Output | Dotted line above 106b from 103 to Solid line into 101d/106b. |
| | C001n | | 101k | Mask set before key expansion begins and held until complete. |
| | C006n | | 101d | $2^{nd}$ 32-bit portion of mask for stage 2 of 128-bit shift register. |
| | $3^{rd}$ Output | | 101d Out | Storing 101d 32-bit word as connected to 106b (Solid line). |
| | C004 | | 106b | Stage 2 of 128-bit shift register shifting by 32-bits. |
| | $3^{rd}$ Output | | 106b Out | Retrieving 101d Output from 106b (Dotted line). |
| | C001p | | 101k | During key expansion, prior mask is 32-bit portion of 128-bit mask used on the column register currently being shifted. |

TABLE 4-continued

| Table 4 List Item | Reference FIG. 1 | Applied FIG. | Applied Ref. Des. | Comments |
|---|---|---|---|---|
| | C006p | | 101d | $2^{nd}$ 32-bit portion of mask for stage 2 of 128-bit shift register. |
| | DOUT 2 | | 101d Output | 106b Output after 32-bit portion of mask is removed by 101d. |
| | C011, Re-masking Path | | 106b-101d | From 106b (Dotted line output) upward through 101d (indicating removal of $2^{nd}$ stage mask), routed by 103 to 101d input (Dotted nine with ending arrow above 106c, the $3^{rd}$ stage of 128-bit shift register). |
| 4.c | | | | Stage 3 Employing Instance 3 of 4 of the Odd Example. |
| 4.c | DIN 3 | 2C and 4 | 103 Output | Dotted line above 106c from 103 to Solid line into 101d/106c. |
| | C001n | | 101k | Mask set before key expansion begins and held until complete. |
| | C006n | | 101d | $3^{rd}$ 32-bit portion of mask for stage 3 of 128-bit shift register. |
| | $3^{rd}$ Output | | 101d Out | Storing 101d 32-bit word as connected to 106c (Solid line). |
| | C004 | | 106b | Stage 3 of 128-bit shift register shifting by 32-bits. |
| | $3^{rd}$ Output | | 106c Out | Retrieving 101d Output from 106c (Dotted line). |
| | C001p | | 101k | During key expansion, prior mask is 32-bit portion of 128-bit mask used on the column register currently being shifted. |
| | C006p | | 101d | $3^{rd}$ 32-bit portion of mask for stage 3 of 128-bit shift register. |
| | DOUT 2 | | 101d Output | 106c Output after 32-bit portion of mask is removed by 101d. |
| | C011, Re-masking Path | | 106c-101d | From 106c (Dotted line output) upward through 101d (indicating removal of $3^{rd}$ stage mask), routed by 103 to 101d input (Dotted line with ending arrow above 106d, the $4^{th}$ stage of 128-bit shift register). |
| 4.d | | | | Stage 4 Employing Instance 4 of 4 of the Odd Example. |
| 4.d | DIN 3 | 2C and 4 | 103 Output | Dotted line above 106d from 103 to Solid line into 101d/106d. |
| | C001n | | 101k | Mask set before key expansion begins and held until complete. |
| | C006n | | 101d | $4^{th}$ 32-bit portion of mask for stage 4 of 128-bit shift register. |
| | $3^{rd}$ Output | | 101d Out | Storing 101d 32-bit word as connected to 106d (Solid line). |
| | C004 | | 106b | Stage 4 of 128-bit shift register shifting by 32-bits. |
| | $3^{rd}$ Output | | 106d Out | Retrieving 101d Output from 106d (Dotted line). |
| | C001p | | 101k | During key expansion, prior mask is 32-bit portion of 128-bit mask used on the column register currently being shifted. |
| | C006p | | 101d | $4^{th}$ 32-bit portion of mask for stage 4 of 128-bit shift register. |
| | DOUT 2 | | 101d Output | 106d Output after 32-bit portion of mask is removed by 101d. |
| | C011, Re-masking Path | | 106d-102 | From 106d (Dotted line output) upward through 101d (indicating removal of $4^{th}$ stage mask), routed to MUX above Substitution Tables 102 (Dotted line with ending arrow into that MUX) as the input to 102 during the key expansion operation. |
| 5 | | | | Key schedule re-masking Odd Example |
| 5 | C004 | 2C and 4 | 107 | Contains masked 128-bit key schedule items. |
| | $3^{rd}$ Output | | 107 Output | Retrieved masked key schedule entries passed to 103p |
| | C001p | | 101p | Loaded from, and concurrently with, Next Mask Register |
| | C006p | | 103p | Removes last mask used during key expansion or the previous re-masking operation |
| | DOUT 2 | | 103p Output | Labeled as "Clear Form KEY" in referenced Figures |
| | C011 | | 103p-103n | Re-masking Path through Clear Form KEY in 107a |
| | DIN 3 | | 103p Output | Clear Form KEY in 107a |
| | C001n | | 101k | Mask set before key re-masking begins; held until complete. |
| | C006n | | 103n | |
| | $3^{rd}$ Output | | 103n Output | Stored re-masked key values placed back in key schedule RAM, 107 |
| 6 | | | | State Register Masking Odd Example |
| 6 | DIN 3 | 2C and 4 | 108 Output | Add round-key output is normally stored in the AES State Register, 109, when Dynamic Data Masking is not employed. |
| | C001n | | 101b | Mask value used to store the AES State Register value. |
| | C006n | | 109b | Masking XOR operator. |
| | $3^{rd}$ Output | | 109b Output | Masked AES State Register value to be stored. |
| | C004 | | 109 | The memory/value being protected in this application of DDM. |
| | $3^{rd}$ Output | | 109 Output | Masked AES State Register value to being retrieved. |
| | C001p | | 101a | Prior Mask value saved when AES State Register was written. |
| | C006p | | 109a | Prior Mask XOR operator, removes masking that was applied. |
| | DOUT 2 | | 109a Output | Becomes Data Out Register, 110 input and input to ABS Shift Rows/Substitution Table inputs, 101. |

Figure 3A:
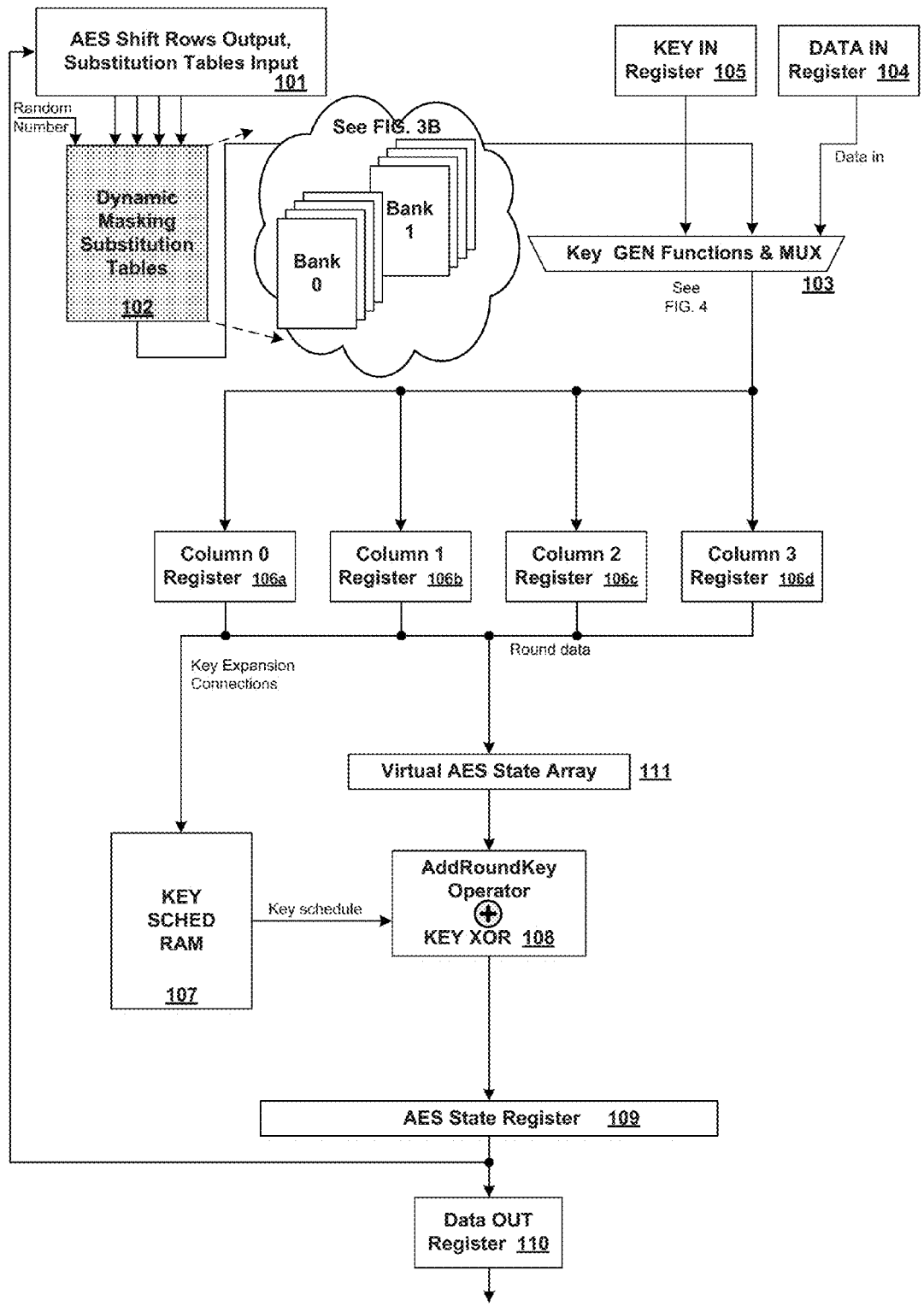
FIG. 3A is a block diagram illustrating an example substitution table module in an example system.
Figure 3B:
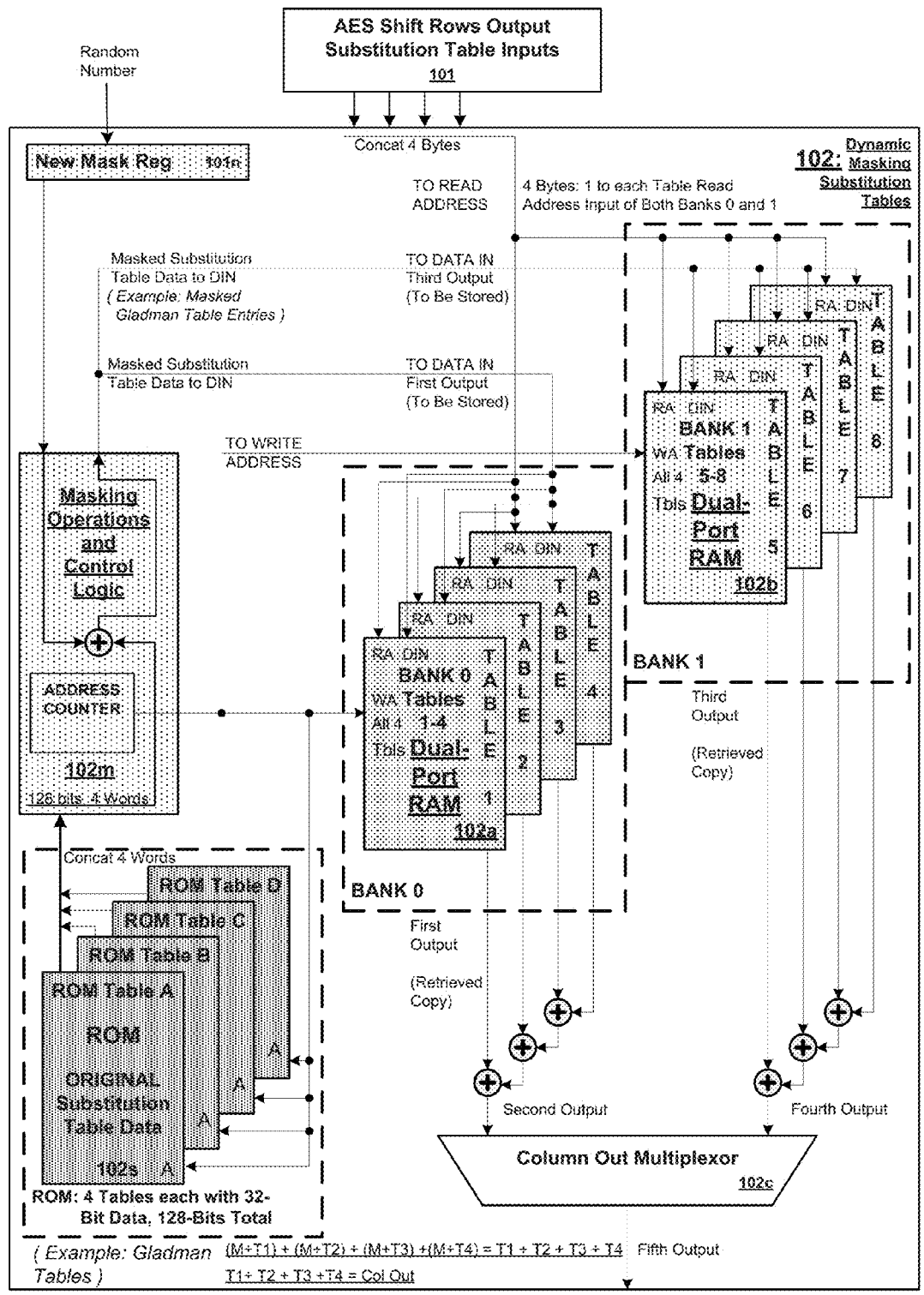
FIG. 3B is a block diagram illustrating an exemplary substitution table in which the present methods and systems can operate.

FIG. 3A is a block diagram of an exemplary tables-based AES configuration with Substitution tables 102 replacing the standard and static substitution tables 102 shown in FIG. 2A. FIG. 3B is a block diagram of an exemplary dynamic masking Substitution table module in a tables-based AES configuration. In an aspect, the dynamic masking Substitution table module can be implemented in any cryptographic algorithm such as AES. DES, or triple DES operations, where repetitive substitutions can be performed via a lookup table. As an example, for the Gladman tables based AES, the dynamic masking methods applied during key expansion can be based on the Even Example, illustrated in FIG. 1. In this scenario, operation (e.g., an XOR operation) that acts on the four Gladman substitution table outputs can be employed to dissolve a mask when the same mask is applied to each input.

A brief description of each module of FIG. 3B is illustrated in Table 5.

T4 as described by Gladman. In an aspect, the substitution table masking module 102 can comprise a masking operations and control function 102m. This module can retrieve original substitution table entries from the substitution table source 102s, apply the new mask register 101n via an XOR operation, and store the result in Bank 0 dual-port RAMs 102a or Bank 1 dual-port RAMs 102b for each and every address location in source substitution table 102s. In an aspect, both RAM bank 0 102a and RAM bank 1 102b can take lookup table input data, and transform them into output data in cryptographic operations, while the lookup table source 102s is used in the masking and re-masking operations but never used in the cryptographic operation. A Substitution source table and the masked representations of the Substitution source table as stored in RAM bank 0 102a and RAM bank 1 102b can be implemented as lookup tables. In an aspect, RAM bank 0 102a and RAM bank 1 102b can be covered with unlimited and continuously changing

TABLE 5

| Item | Function Name | Description |
| --- | --- | --- |
| 101 | Substitution table input | Four bytes from AES state register selected via the AES ShiftRows or InvShiftRows function, forming a single AES column as inputs for the Substitution (Gladman) Tables. |
| 101n | New Mask Register | Register containing the mask value being applied to either Bank 0 or Bank 1. |
| 102 | Dynamic masking Substitution tables | Substitution tables (e.g., Gladman AES Tables) with the dynamic masking applied as described herein. |
| 102m | Masking Operations and Control Logic | This module contains the address counter used on the memory elements of 102s, 102a WA and 102b, WA. The Masking Operations uses this address value to index the read data from the substitution table in the initialized memory (e.g., ROM), and index the correct location to store the masked substitution table value via the write address inputs of the memory elements in Bank 0 and Bank 1 |
| 102s | Original Substitution Tables | This initialized memory element(s) (e.g., ROM) contain(s) look-up table contents as needed for the design to function correctly. For example, contents of Gladman Tables T1 through T4 as described by Gladman. |
| 102a | Masked Substitution Tables in Bank 0 memory elements | The Bank 0 memory elements Table 1 through Table 4 (e.g., Dual Port RAM) contain the masked look-up table contents, using a first mask, as generated by 102m, the masking operations and control logic. The masked substitution table contents are indexed via the write address (WA) input of the Dual-Port RAM when being stored via the data in (DIN) input. The masked substitution table contents are indexed via the read address input when the data transformation is performed, as is done for each byte of the column input per Gladman's implementation using tables description. In this case, contents of Gladman Tables T1 through T4 as described by Gladman. |
| 102b | Masked Substitution Tables in Bank 1 memory elements | The Bank 1 memory elements Table 1 through Table 4 (e.g., Dual Port RAM) contain the masked look-up table contents, using a next mask, as generated by 102m, the masking operations and control logic. The masked substitution table contents are indexed via the write address (WA) input of the Dual-Port RAM when being stored via the data in (DIN) input. The masked substitution table contents are indexed via the read address input when the data transformation is performed, as is done for each byte of the column input per Gladman's implementation using tables description, for each In this case, contents of Gladman Tables T1 through T4 as described by Gladman. |
| 102c | Column Out Multiplexing | The second output and the fourth output are selected based on which memory bank is NOT being updated with a new mask value. |

In an aspect, substitution table masking module 102 can comprise a substitution table source 102s. A substitution table source (e.g., original substitution table data 102s) can comprise one or more initialized memory elements (e.g., one or more ROMs) which contain(s) substitution table contents as needed for the design to function correctly. In this case, it is the contents of substitution (Gladman) tables T1 through masks. The masks can be random numbers generated by a random number generator. Random numbers can be generated in sequence and saved in a new mask register 101n. In an aspect, the Substitution source table 102s can be a table that incorporates a SubBytes algorithm and mix columns algorithm in AES, or the selection functions $S_1, S_2, \ldots S_8$ in a DES, or triple DES operation. In another aspect, the Substitution table 102s can incorporate an InvSubBytes algorithm and inverse mix columns algorithm in AES. In an aspect, the Substitution source table 102s can itself be covered with a mask. However, this mask would not be dynamic like those retrieved from the new mask register 101n. Rather, it would be a mask selected at the design stage of the product and applied via an operation to all entries in all four tables in the substitution source table function 102s before the source table is read for the first time in generating the first set of masked tables (e.g., Bank 0 RAM tables). As an example, a mask to cover source table contents for the Substitution table module 102s can be a 32-bit random number selected during a design phase and an operation (e.g., an XOR operation) performed on the each entry for every table of the four substitution source tables (e.g., Gladman tables T1 through T4). The fixed mask in the dynamic data masking can further alter the entries in Bank 0 dual-port RAMs 102a and Bank 1 dual-port RAMs 102b. In an aspect, the Bank 0 dual-port RAMs 102a containing masked substitution table entries (e.g., dynamically masked versions of the source tables in Substitution table module 102s) can be used 4 times per round of cryptographic operation to determine 128-bit, four×32-bit column AES state array. Once a mask is used, it can be called a prior mask (Mp), and a next mask (Mn) can be obtained from the new mask register 101n. In an aspect, two sets of Substitution tables (e.g., Bank 0 102a, Bank 1 102b) can be generated. Bank 0 can comprise four Substitution tables, viz., Table 1 (T1). Table 2 (T2), Table 3 (T3), and Table 4 (T4), each table covered with the prior mask Mp. Bank 1 can also comprise four Substitution tables, Table 5 (T5), Table 6 (T6). Table 7 (T7), and Table 8 (T8), each table covered with the next mask Mn.

In an aspect, two sets of Substitution tables (e.g., Bank 0, Bank 1) can be masked in turn using a new mask retrieved from the new mask register 101n. Specifically, while one set of Substitution tables is used for a cryptographic operation (e.g., performing the lookup table function), another set Substitution tables can be generated using a new mask obtained from new mask register 101n. For example, while Bank 0 is used for a cryptographic operation (e.g., lookup table function in an AES E/D operation), Bank 1 can be generated using a new mask (e.g., next mask Mn). Similarly, while Bank 1 is used for a cryptographic operation (e.g., lookup table function in an AES E/D operation), Bank 0 can be generated with a new mask (e.g., next mask Mn). In an aspect, the length of time a mask is used can be the number of clocks used to generate the set of Substitution tables (e.g., T1, T2, T3, T4, or T5, T6, T7, T8). Therefore, data masking operations can be constantly performed to generate the set of Substitution tables that is not used for an encryption or decryption operation. In an aspect, two sets of Substitution tables (e.g., T1, T2, T3, T4, or T5, T6, T7, T8) can be multiplexed and controlled by a masking counter (e.g., multiplexor 102c) to prevent the Substitution table under the masking operation from being used simultaneously for an AES E/D operation.

An example method for a masking Substitution table can comprise generating a first output by performing an operation on a first random number and a first data block and storing the first output in a lookup table RAM. A second output can be generated by retrieving the first output from RAM and performing an operation on the retrieved first output and a second data block. A third output can be generated by performing an operation on a second random number and the first data block and storing the third output in another lookup table RAM. A fourth output can be generated by retrieving the third output from RAM and performing an operation on these retrieved third outputs and the second data block. A fifth output can be generated by multiplexing the second output and the fourth output. As an example, the first data block can be original substitution table entries in Substitution table module 102s (e.g., 128 bits for AES wherein $N_b=4$). The first random number can be a prior Substitution table mask (e.g., the same length as the data block being covered). Other data block lengths for other applications work the same as long as the mask length matches the data block length. The first output can be Substitution table 102s covered with the prior mask Mp in 102m and stored in BANK 0 dual-port RAMs 102a. The second data block can be the data to be transformed and can be connected to the substitution table inputs 101. The operation on the first random number and the first data block can be an XOR operation as in 102m, the output of which is stored in BANK 0 RAMs in 102a. The operation on the second data block can be a lookup table operation that retrieves the correct first output from 102a for all four tables. The second data block can be thus transformed into four first outputs, one from each table in BANK 0, which can then have an XOR operation performed on these four BANK 0 lookup table outputs to create the second output. The second output can be un-masked output generated from an operation, (e.g., an XOR operation) of the masked transformed data from 102a (e.g., T1, T2, T3, T4 lookup table outputs) covered with the prior mask Mp. Mp can be dissolved by the XOR operation on an even number of masked values, in this case four values. Similarly, the second random number can be a next mask Mn. The next mask Mn can be generated by a random number generator and retrieved from the new mask register 101n. The third output can be Substitution table 102s covered with the next mask Mn in 102m and stored in Bank 1 dual-port RAMs 102b. The operation on the second random number and the first data block can be an XOR operation as in 102m, the output of which is stored in Bank 1 dual-port RAMs 102b. The retrieved third output can be the result of a lookup table operation using the second data block as the substitution table inputs that retrieves the correct third outputs from 102b for all four tables. The fourth output can be un-masked output generated from an operation, (e.g., an XOR operation) of the masked transformed data from tables in Bank 1 dual-port RAMs 102b (e.g., T5, T6, T6, T8 lookup table outputs) covered with the next mask Mn. Mn can be dissolved by the XOR operation on an even number of masked values, in this case four values. In an aspect, the fifth output can be selected from the second output or the fourth output, based on the multiplexing process shown as multiplexor 102c. In a further aspect, the multiplexing function can be performed by combining BANK 0 102a and BANK 1 102b in a single set of four tables each and use the new upper most address bit as the multiplexing selection signal. For example, when the second output is being generated (e.g., masked by a prior mask), the fifth output can be from the fourth output. Similarly, when the fourth output is being generated (e.g., masked by a next mask), the fifth output can be from the second output.

In a standard tables-based AES E/D operation, a round output (e.g., a second output, a fourth output) can result from an XOR operation of the four individual Substitution tables (e.g., T1, T2, T3 and T4) in a set of substitution tables. Therefore, when each individual substitution table is covered by a mask M, and an XOR operation can be performed on four masked Substitution tables (e.g., T1, T2, T3, and T4) according to the standard tables-based AES E/D operation. M can be dissolved in the XOR operation. As a result, the output of the XOR operation on four masked Substitution tables is the same as the output in a standard tables-based AES E/D operation.

Mathematically, T1, T2, T3, and T4 can denote four tables generated in a tables-based AES E/D operation. Therefore, the AES state array value just prior to the application of the AES AddRoundKey function can be denoted by T1+T2+ T3+T4. In an aspect, an XOR operation can be performed on a mask M and each table, and "+" can denote the XOR operation, such that (M+T1)+(M+T2)+(M+T3)+(M+ T4)=T1+T2+T3+T4. In other words, the Mask M can dissolve in XOR operations of the four tables' output values (e.g., on an even number of masked values, in this case four), because M+M=0. As an example, M can be a prior mask Mp in generating T1, T2. T3 and T4. As another example, M can be a next mask Mn in generating T5, T6, T7 and T8.

In an aspect, subsequent to initializing both Bank 0 dual-port RAMs 102a and Bank 1 dual-port RAMs 102b, generating a first output (e.g., by masking the contents of a first data block from the original substitution table data 102s using Mn in masking operations and control function 102m and storing these masked table entries in Bank 0 dual-port RAMs 102a via the dual port RAM write port), while generating a fourth output during an AES cryptographic operation (e.g., by performing a data transformation on a second data block using substitution table inputs 101 to retrieve the correct substitution table entries from Bank 1 102b via the dual port RAM read port, which contains the previously generated third output masked with Mp and stored in Bank 1 102b when generated) can occur simultaneously. In a further aspect, while generating a second output (e.g., by performing a data transformation on a second data block using substitution table inputs 101 to retrieve the correct substitution table entries from Bank 0 102a, which contains previously generated first output masked with Mp and stored in Bank 1 102a) and generating a third output generation (e.g., by masking the contents of a first data block from the original substitution table data 102s using Mn in masking operations and control function 102m and storing these masked table entries in Bank 1 dual-port RAMs 102b) can also occur simultaneously. A column output multiplexor can select the Bank whose read port is active and be configured to receive substitution table inputs 101 and whose write port is inactive. Thus, the dynamic masking substitution table function can be able to constantly and simultaneously provide cryptographic operation support while internally re-masking the RAM bank that is not being used to support cryptographic operations. In an aspect, the RAM bank that is being written with newly masked table entries can use mask Mn and the RAM bank that is supporting cryptographic operations is always using mask Mp. This means that as soon as mask value Mn has been used to cover one RAM bank, it immediately becomes mask value Mp.

In an aspect, the duration of a mask (e.g., Mp or Mn) can be a defined length of time. For example, if there are 1024 entries in the original substitution table 102s, each address in the substitution table 102s can be read in one clock cycle, and then written after performing an XOR operation on the read value with a mask (e.g., Mn) on a second clock cycle. In this example, it would take two clock cycles per each table entry to re-mask that entry and store the result in Bank 0 102a, or Bank 1 102b. Therefore, 2048 clock cycles would be required to remask one RAM bank. Also assume, for this example, the number of clock cycles required to complete a cryptographic operation (e.g., an AES E/D operation) is 512 clock cycles. If the re-masking operation and the first of four back-to-back AES E/D operations start on the same exact clock cycle, the duration of the mask can be exactly four AES E/l operations. However, if the set of four back-to-back cryptographic (e.g., AES) operations starts between one and 511 clock cycles after re-masking operation starts, the re-masking operation will complete sometime during the fourth back-to-back AES E/D operation instead of in the same clock cycle as the completion of the fourth back-to-back AES E/D operation. Thus, in this example, the duration of a mask can be between three or four back-to-back cryptographic (e.g., AES) operations. In an aspect, the duration in clock cycles to re-mask one RAM bank, such as Bank 0 dual-port RAMs 102a or Bank 1 dual-port RAMs 102b, may be longer, and the cryptographic (e.g., AES) operation may be shorter, depending on implementation choices. Other possible combinations exist as well. As an example, assume the duration of the mask, instead of three or four cryptographic operations, is 100 cryptographic operations. Given that the DPA requires many hundreds of thousand samples with the same mask in order to successfully extract the key information from the power signature, there can be a minimum of three orders of magnitude between the number of samples required for a DPA attack to succeed versus the number of cryptographic operations performed by the present disclosure before a mask is changed. Thus, at three or four cryptographic operations, there would be approximately five orders of magnitude, making the attack that much less likely to succeed. In an aspect, a dynamic masking process can repeat indefinitely until a threshold is detected. For example, a threshold can be detected when a data stream is processed, wherein the data steam comprises a plurality of data blocks. As another example, a threshold can be detected when a reset command is received. Changing the mask constantly can prevent power analysis attacks such as SPA, DPA, DFA, or DSA attacks.

In an aspect, whether the re-masking operation starts on the same clock cycle as the cryptographic operation or if the start of two operations can vary widely and without regard to what part of, or even whether, cryptographic operation (e.g., AES E/D operation) is occurring. For example, the start times of two operations can be non-synchronized, both operations can continue to perform correctly as long as the switching of the column output multiplexor occurs at the completion of the re-masking of one RAM bank (e.g., for example 102a) and the beginning of the re-masking operation of the other RAM bank (e.g., 102b). In an aspect, all four tables of a RAM bank being used for cryptographic operations need to be masked with the same mask value. When CSVs are constants, as is the case in substitution tables, the CSVs can be masked and re-masked in a manner that is not necessarily aligned to the same point in each cryptographic operation (e.g., and AES E/D operation). In an aspect, the use of two RAM banks for the same content, versus only one, allows one to be enabled for cryptographic operations while the other is being re-masked. If the requirement to always use the RAM bank that is not being re-masked as the one used for cryptographic operations and the logic is using a same system clock, the output of the two RAM banks can be multiplexed in a manner to allow 100% availability of the cryptographic operation while allowing for unlimited and continuously changing masks.

In an aspect, a cryptographic engine for data decryption does not need to know, or be synchronized in any way to, the masks used to encrypt the data. This is because the dynamic masking in the disclosed methods and systems do not alter the value of any intermediate or final cryptographic results during cryptographic operations (e.g., AES E/D operations). While a mask is applied to the CSVs when these values are stored or retrieved because the act of storing or retrieving is a notable power consumption event, that mask is always dissolved or removed before and/or during a next cryptographic operation is performed. In other words, the cryptographic operations can be always performed on, or result in, unmasked or clear data, while the resultant intermediate values of cryptographic operations can be covered with masks before they are stored in a memory (e.g., RAM or Flip-Flop). In an aspect, substitution table masking in a cryptographic engine can be agnostic. Specifically, substitution table masking can be disassociated or not coordinated in any way as compared to Cipher-Block-Chaining (CBC) which requires encryption and decryption processes to use the same initialization vector of the masking performed with the associated inverse cryptographic operation. For example, a cryptographic engine configured to perform decryption operations does not need to know about the masks used by the cryptographic engine configured to perform the encryption operations. Similarly, a cryptographic engine configured to perform encryption operations does not need to know about the masks used by the cryptographic engine configured to perform the decryption operations. This agnostic characteristic exists because cryptographic calculation values and constants used to perform a cryptographic operation (e.g., an AES E/D operation) can be performed on un-masked or clear data, while the resultant CSVs can be stored in a memory (e.g., RAMs or FFs) covered with constantly changing masks. In another aspect, substitution table masking can be non-synchronized with the beginning or ending of a cryptographic operation (e.g., an AES E/D operation). While substitution table masking can be synchronous to the system clock of the cryptographic engine to which dynamic masking is being applied, it is not necessary that substitution table masking begin at a particular point in the AES E/D operation or occur on every AES E/D operation. This means that the masks (Mn, Mp) used to cover a substitution tables can be used for multiple AES E/D operations until a threshold is reached, such as a predefined count of the number of times the AES E/D operation has been performed. While most it is desirable to keep this count significantly smaller than the tens or hundreds of thousands of cryptographic operations (e.g., AES E/D operations) required to perform a successful power analysis attack, this non-synchronized and threshold based characteristic allows for a trade-off to be made between reduced power consumption when the mask is changed less frequently and more protection against information leakage when the mask is changed more frequently.

Figure 4:
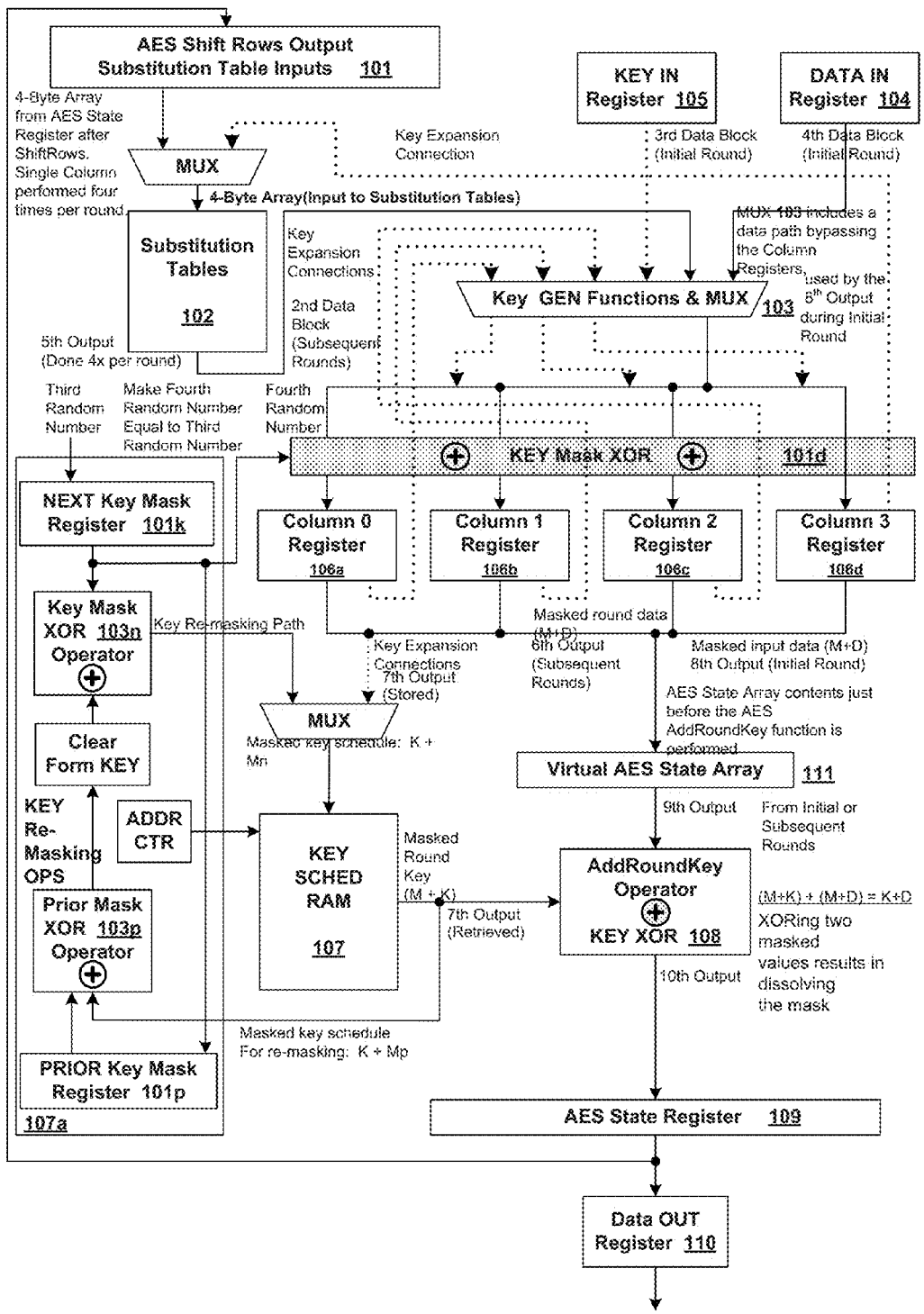
FIG. 4 is a block diagram illustrating an exemplary environment in which the present methods and systems can operate.

FIG. 4 is a block diagram of an exemplary tables-based AES configuration with dynamic key schedule masking. In an aspect, the dynamic key schedule masking can be applied before an AES E/D operation occurs and/or during an AES E/D operation.

During Key Expansion:

In an aspect, before an AES E/D operation occurs, a 128-, 192-, or 256-bit key input can undergo a key expansion function where round keys are generated to form a complete schedule for a subsequent AES E/D operation. These round key values can all be masked with the same key mask value when generated and then stored in key schedule RAM 107. For a Gladman tables based AES example design, the dynamic masking methods can be applied during key expansion based on the Odd Example described in FIG. 1. In an aspect, four words of each round key, as they are shifted through the column registers 106a through 106d, require the prior 32-bit portion of the Mn mask to be removed and the next 32-bit portion of the Mn mask to be applied. This is done in an operation (e.g., an XOR operation) that is not part of the original example design, but requires an additional operator as part of the dynamic masking methods being applied.

During Key Schedule Re-Masking:

Additionally, before an AES E/D operation, the key schedule in masked form and that was stored in key schedule RAM 107 during the key expansion and storing operation, can be re-masked with a new mask. This key schedule re-masking can also occur on the masked key schedule in key schedule RAM 107 after the last AES E/D operation if the current AES E/D operation uses the same key. For the Gladman tables based AES example design in this disclosure, the dynamic masking methods applied during key schedule re-masking are based on the Odd Example in FIG. 1, including the re-masking path C011. This is because each round key requires the prior Mp mask to be removed and the next Mn mask to be applied. This is done in an operation (e.g., an XOR operation) that is not part of the original example design, but requires an additional operator as part of the dynamic masking methods being applied.

During an Initial Round of an AES E/D Operation (e.g. a cryptographic operation), key masking can be applied during the initial round. In compliance with the AES specification (e.g. FIPS 197), the initial round differs from the subsequent round described below in that the data path routing from Data In Register 104, through MUX 103 function to Virtual AES State Array 111 bypasses the column registers 106a-d instead of loading them as is the case in the subsequent rounds. Therefore, the masked input data, masked with the same mask value as the key schedule, becomes the contents of Virtual AES State Array 111. For the Gladman tables based AES example design in this disclosure, the dynamic masking methods applied during the initial round of the AES E/D operation are based on the Even Example in FIG. 1. This is because there is a system operation (e.g., an XOR operation) in the AES AddRoundKey operator that can be employed to dissolve the mask when the same mask is applied to each input.

During Subsequent AES E/D Rounds:

In an aspect, the subsequent rounds data path routing through MUX 103 function to Virtual AES State Array 111 includes loading the Column Registers 106a-d with the output of Substitution Tables 102, instead of the data from Data In Register 104. Despite this difference in data path routing, the content of Virtual AES State Array 111, in both cases, is masked data covered with the same mask as the key schedule. For the Gladman tables based AES example design in this disclosure, the dynamic masking methods applied during the subsequent rounds of the AES E/D operation are based on the Even Example in FIG. 1. This is because there is a system operation (e.g., an XOR operation) in the AES AddRoundKey operator that can be employed to dissolve the mask when the same mask is applied to each input.

As an example of dynamic key masking during the key expansion and storing operation, a seventh output (e.g., masked round key that will be stored in key schedule RAM 107) with the same bit length as the input key 105 can be generated as follows. The initial round key is the input key 105, so the seventh output for the initial key expansion round, which simply creates a masked version of the input key, is generated by performing an operation (e.g., an XOR operation performed in Key Mask XOR operator 10d) on a fourth random number (e.g., key mask Mn stored in key mask register 101k) and a third data block (e.g., a input key). For the subsequent key expansion rounds, the seventh output can be generated by performing an operation (e.g., an XOR operation performed in Key Mask XOR operator 101d) on a fourth random number (e.g., key mask Mn stored in key mask register 101k) and a third data block (e.g., a round key) as generated 32-bits (e.g., one word) at a time by Key GEN Functions 103, shifted into Column Registers 106a-106d one word at a time to form 128-bit masked key schedule entry for one round, and then stored as a 128-bit value in key schedule RAM 107 for all entries forming the full key schedule for an AES E/D operation. During the initial round of the AES E/D operation, a ninth output (e.g., masked input data covered with the key mask Mn stored in key mask register 101k) can be generated by performing an operation (e.g., an XOR operation) on the fourth random number and the fourth data block (e.g., input data block to AES module) shown as data in register 104. During subsequent rounds of the AES E/D operation, the ninth output can be generated by performing an operation (e.g., an XOR operation) on the fourth random number and the sixth output. The sixth output uses four instances of the fifth output from Substitution Tables 102 as the data block source instead of the input data 104 as the data block. Also during the initial or subsequent rounds, a tenth output can be generated by performing an operation (e.g., the AES AddRoundKey function which is shown as AES AddRoundKey XOR operator 108) on the retrieved seventh output and the ninth output.

It can be seen that the seventh output (e.g., round key) and the ninth output (e.g., input data or column output data) can be covered with the same mask Mn. The tenth output can be generated by XOR operations involving the seventh output and the ninth output. The tenth output can be generated in the AES AddRoundKey XOR Operator 108, which is the standard AES AddRoundKey function, and stored in the AES State Register, 109. Therefore, the tenth output can be the AES state array after the round key is applied in clear form. Key_mask Mn can be dissolved in the XOR operation by virtue of an even number of values, in this case two, being masked with the same mask value, namely key mask Mn, resulting in the mask dissolving with the result being the same as what would be achieved if the same XOR operation was performed on the two values in clear form.

In an aspect, a round key K stored in key schedule RAM 107 can be covered with a mask, for example, a prior mask Mp. During key schedule re-masking, the round key covered with the prior mask Mp (e.g., K+Mp) is retrieved from a memory (e.g., Key schedule RAM 107) for the key schedule re-masking operation. An XOR operation can be performed on K+Mp and the prior key mask Mp stored in Prior Key Mask Register 101p, which will result in a round key in clear form K+Mp+Mp or K. As an example, the XOR operation can be performed in the prior mask XOR operator 103p. In an aspect, the function of the KEY Re-Masking Operations 107a can be to provide Mn and Mp key mask registers, 101k and 101p, Mn and Mp XOR operators, 103p and 103n, as well as the addressing function via an address counter for the round keys of a specific key schedule. The KEY Re-Masking Operations 107a allows the retrieval of each masked round key in a key schedule for re-masking, performs re-masking operation, then re-stores each round key masked with Mn into key schedule RAM 107 during the key schedule re-masking operation. An XOR operation can be performed on the round key in clear form and a next key mask Mn. Mn can be retrieved from key mask register 101k. The XOR operation with the next key mask Mn can be performed in Key Mask XOR Operator 103n. As a result, the output of 103n can be round key covered with next mask K+Mn. In an aspect, K+Mn can be stored in a memory (e.g., key schedule RAM 107) for a subsequent round of retrieval during and AES E/D operation. In this case, Mn becomes Mp in the next key schedule re-masking operation.

In an aspect, the operation of masking and re-masking the round keys can be synchronized with the AES E/D operation of the AES module. Because the intent of the disclosed methods in this particular application of the key mask is to dissolve the key mask used, Mn, in the AES AddRoundKey function, (e.g., an XOR operation), the mask value used for covering the round key and the value of the AES state array just prior to the AddRoundKey transformation must be the same value for both elements on a per-round basis. As long as this criterion is met, the key schedule re-masking operation can occur at various places within an AES E/D operation. In an aspect, it is possible to use a unique key mask per round for these two elements. However, in an aspect doing so would require storing and retrieving each mask, Mn and Mp, on a per-round basis instead of on the per-AES E/D operation basis described in this disclosure. In another aspect, doing so would add complexity and cost with little to no additional resiliency against DPA attacks. In an aspect, the key schedule re-masking can be applied between each AES E/D operation using the same key schedule, or, in another aspect, could be performed when a threshold condition is met. For example, a threshold can be detected after a specified multiple of data blocks to which the cryptographic (e.g., AES E/D) operations have been applied when a data stream is processed, wherein the data steam comprises a plurality of data blocks. In another aspect, the threshold could be after a specified number of AES rounds are completed. In this regard, the finite state machine (e.g., FSM) controlling the AES E/D operations could be halted after this threshold is met, even if it is in the middle of and AES E/D operation at the time. As long as the seventh and ninth outputs are masked with the same mask before the AES AddRoundKey XOR operator 108 function is performed, the mask will be dissolved correctly. This means that while key masking and re-masking must by synchronous to the system clock of the cryptographic engine to which dynamic masking is being applied, the key re-mask operation can be time-displaced with respect to the beginning or ending of a cryptographic operation (e.g., an AES E/D operation). While it is most desirable to keep this count significantly smaller than the tens or hundreds of thousands of cryptographic operations (e.g., AES E/D operations) required to perform a successful power analysis attack, this time-displaced and threshold based characteristic allows for a trade-off to be made between reduced power consumption when the mask is changed less frequently (e.g., after multiple AES E/D operations) and more protection against information leakage when the mask is changed more frequently (e.g., before or after every AES E/D operation, or as frequently as every round). In this regard, all these aspects require coordination of the key masking and re-masking with the AES ED operation and, as such, are synchronized with it. As another example, a threshold can be detected when a reset command is received. In each case, changing the mask constantly can prevent power analysis attacks such as SPA, DPA. DFA, or DSA attacks Mathematically, before an AES E/D operation, a round key schedule can be masked during the key expansion operation that generates the key schedule. As an example, the initial key expansion round key is the input key Kin. When masked with a fourth random number Mn (e.g., a key mask), this results in the seventh output Kin+Mn. This seventh output is first stored in Column Registers 101a through 101d for further key expansion calculations that includes storing each masked round key in Key schedule RAM 107 as it is generated. After the initial key expansion round, the seventh output (e.g., a masked round key) can be generated by performing an operation (e.g., an XOR operation) on a fourth random number (e.g., a key mask) and a third data block (e.g., 128- (or 192- 256-) bit round key). This 128-bit seventh output for rest of the key schedule (e.g. subsequent round keys) is available after every four shifts of the 128-bit shift register with the appropriate word of the round key being routed to the substitution table transformation (e.g., look-up table) operation resulting in the fifth output, along with the other operations, as used during key expansion. For example, the following table illustrates the masking of the subsequent round keys as they are generated and shifted into column registers 106a through 106d when configured for the key expansion operation via Key Generator Functions and Multiplexor 103.

Table 6 illustrates key expansion process during the disclosed dynamic data masking.

In an aspect, bit notations for key_in, key_mask, and round key are [0:127] meaning the left-most bit of the value, not the physical location in FIG. 4, is bit 0 and the right-most bit is bit 127. Column Registers 0 through 3 contain the portions of round key as shown in Item (a.) and are masked with Mn as also shown. In another aspect, the round key name is shown as kRn, kR1 denotes round one key (e.g., the initial round key), kR2 for round two key, and so on. The term "next" indicates the first key word of the next round key as defined in FIPS 197. The 128-bit round key is the concatenation of the column registers as follows: round_key={Col 3 Reg, Col 2_Reg, Col 1 Reg. Col 0 Reg}. The notation "mCn" (e.g., mC2) means that portion of the key in Column "n" Register is masked. In another aspect, the mask removed item in the table, although designated Mn, functions as prior mask value Mp from the Odd Example in FIG. 1. During key expansion, next mask does not change, but 32-bit portions of the next mask covering a specific word of the round key do change as the key words are shifted.

TABLE 6

| Item | Column Loaded | Mask Removed | Next Mask Mn | Key | Description of Word Shift |
|---|---|---|---|---|---|
| a. | Col 3=<br>Col 2=<br>Col 1=<br>Col 0= | N/A<br>N/A<br>N/A<br>N/A | Mn[0:31]<br>Mn[32:63]<br>Mn[64:95]<br>Mn[96:127] | +key in[0:31]<br>+key in[32:63]<br>+key in[64:95]<br>+key in[96:127] | Initial key expansion round (kR1): Column 0 through Column 3 Registers are loaded with a masked version of key_in according to bit assignments |
| b. | Col 3=<br>Col 2=<br>Col 1=<br>Col 0= | Mn[32:63]<br>Mn[64:95]<br>Mn[96:127]<br>N/A | +Mn[0:31]<br>+Mn[32:63]<br>+Mn[64:95]<br>+Mn[96:127] | +kR1[32:63] (mC2)<br>+kR1[64:95] (mC1)<br>+kR1[96:127] (mC0)<br>+kR2[0:31] (next) | First of four clocks after Initial key expansion round: 1) Write 128-bit round key resulting from Item (a) to Key schedule RAM 107, 2) Column 0 through Column 3 Registers are shifted one word with prior column mask removed and destination column mask applied. |
| c. | Col 3=<br>Col 2=<br>Col 1=<br>Col 0= | Mn[32:63]<br>Mn[64:95]<br>Mn[96:127]<br>N/A | +Mn[0:31]<br>+Mn[32:63]<br>+Mn[64:95]<br>+Mn[96:127] | +kR1[64:95] (mC2)<br>+kR1[96:127] (mC1)<br>+kR2[0:31] (mC0)<br>+kR2[32:64] (next) | Second of 4 clocks after Initial key expansion round: Column 0 through Column 3 Registers are shifted one word with prior column mask removed and destination column mask applied. |
| d. | Col 3=<br>Col 2=<br>Col 1=<br>Col 0= | Mn[32:63]<br>Mn[64:95]<br>Mn[96:127]<br>N/A | +Mn[0:31]<br>+Mn[32:63]<br>+MN[64:95]<br>+Mn[96:127] | +kR1[96:127] (mC2)<br>+kR2[0:31] (mC1)<br>+kR2[32:64] (mC0)<br>+kR2[64:95] (next) | Third of 4 clocks after initial key expansion round: Column 0 through Column 3 Registers are shifted one word with prior column mask removed and destination column mask applied. |
| e. | Col 3=<br>Col 2=<br>Col 1=<br>Col 0= | Mn[32:63]<br>Mn[64:95]<br>Mn[196:127]<br>N/A | +Mn[0:31]<br>+Mn[32:63]<br>+Mn[64:95]<br>+Mn[96:127] | +kR2[0:31] (mC2)<br>+kR2[32:64] (mC1)<br>+kR2[64:95] (mC0)<br>+kR2[96:127] (next) | Fourth of 4 clocks after Initial key expansion round: Column 0 through Column 3 Registers are shifted one word with prior column mask removed and destination column mask applied. |
| f. | Col 3=<br>Col 2=<br>Col 1=<br>Col 0= | | | Con-currently perform Column shifts with the write to Key schedule RAM | 1) Write 128-bit round key resulting from Item (d) to Key schedule RAM 107, 2) Recursively perform Items (b) through (e) until full key schedule is created and stored in Key schedule RAM 107. |

Hence, for each column in each shift of the key during key expansion, the portion of the mask covering a column register being shifted must be treated as the prior mask and removed, before masking that portion of the round key with the key mask used for the destination column of the value. In other words, before an AES ED operation, a round key schedule K can be covered with a prior key mask Mp and stored in key schedule RAM 107, denoted by K+Mp. K+Mp can then be read from a memory (e.g., Key schedule RAM 107) and an XOR operation can be performed on K+Mp and the same prior key mask Mp stored in prior key mask register 101$p$, which becomes round key in clear form K+Mp+Mp or K, because Mp+Mp=0. The round key in clear form can be processed in Key Re-Masking Operations 107$a$. Then an XOR operation can be performed on the round key in clear form K and a next key mask Mn, which can result in K+Mn. In an aspect, K+Mn can be stored in a memory (e.g., key schedule RAM 107). In an aspect, the next key mask Mn (e.g. a 128-bit random number) can be saved in the key mask register 101$k$, and a prior mask Mp (e.g., a 128-bit random number) can be saved in prior key mask register 101$p$. In an aspect, a new key mask can be acquired to cover a key schedule for a current AES E/D operation, or a current round key for a current round of cryptographic operation, as the next key mask Mn, and the number of masks is unlimited.

Mathematically, when an AES E/D operation is performed, input data can be masked by the same mask used on the corresponding round key. For example, D can be input data for encryption, and K can be a current round AES key schedule. In an aspect, an XOR operation can be performed on input data D and next key mask Mn in Key Mask XOR operator 101$d$ and result in D+Mn, wherein "+" denotes XOR operation. D+Mn can be provided to the AES AddRoundKey XOR operator 108 for a subsequent AES AddRoundKey operation.

Therefore, round data generated by the AES AddRoundKey XOR operator 108 can be (K+Mn)+(D+Mn)=K+D because Mn can dissolve in the XOR operation. The Mask Mn can dissolve in the XOR operation of the round data and key schedule value because Mn+Mn=0. Thus there is no change to the operation performed on the output of the column registers as compared to a standard tables-based AES implementation. As a result, round keys stored in key schedule RAM 107 (e.g., a 128-bit key schedule) and input data stored in data in register 104 (e.g., a 128-bit input data) can both be covered with the same 128-bit mask Mn. The XOR operation of the seventh output (e.g., masked 128-bit key schedule) and the ninth output (e.g., masked 128-bit input data) can generate a round data for a state register (e.g., AES state register 109).

In an aspect, the duration of each key mask can be the number of clocks it takes to perform one AES E/D operation (e.g., AES operation). In an aspect, a new key mask (e.g., next key mask Mn) can be obtained from the mask generator 101$k$ at the beginning of an AES E/D operation. The operation can repeat indefinitely until a threshold is detected. For example, a threshold can be detected when a data stream is processed, wherein the data steam comprises a plurality of data blocks. As another example, a threshold can be detected when a reset command is received. As such, the mask can change constantly and thus prevent the multiple trace captures with the same values needed for the SPA, DPA, DFA, or DSA attacks.

In an aspect, the key masking operation can be agnostic of the masks used in the associated inverse cryptographic function. This means, for example, that a cryptographic engine (e.g., an AES engine) used for decryption does not need to know the masks used by the cryptographic engine (e.g., an AES engine) used for the encryption of the data it is receiving. Furthermore, a cryptographic engine (e.g., an AES engine) used for encryption does not need to know the masks used by the cryptographic engine (e.g., an AES engine) used for the decryption of the data it is transmitting. This is because all key generation operations can be performed on unmasked or clear data, while the resultant values can be stored in a memory (e.g., RAM or FF) covered with constantly changing masks.

Figure 5:
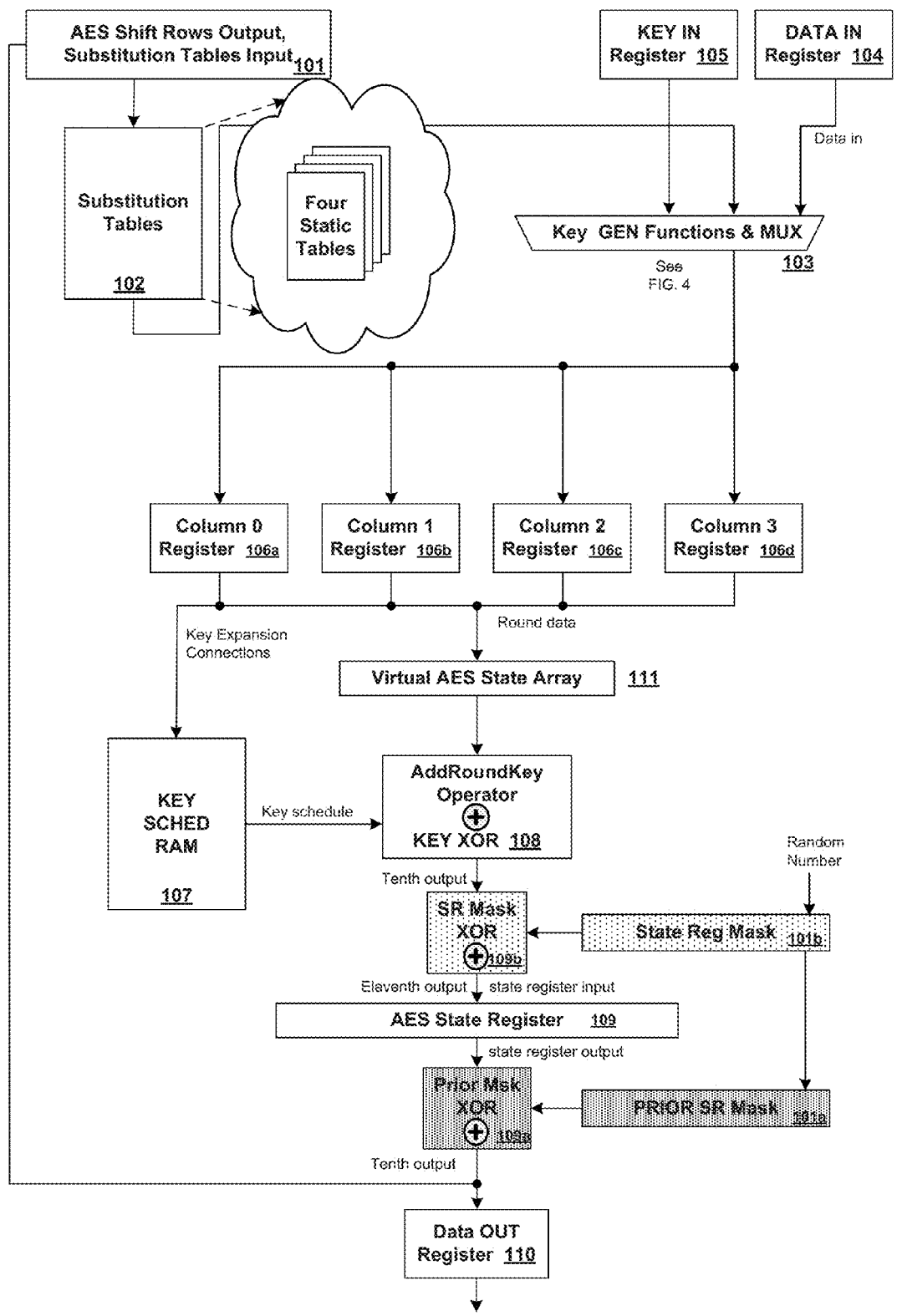
FIG. 5 is a block diagram illustrating another exemplary environment in which the present methods and systems can operate.

FIG. 5 is a block diagram of an exemplary tables-based AES configuration with dynamic state register masking. In the scenario, the dynamic masking methods applied during state register masking can be based on the Odd Example in FIG. 1. This is because each CSV (e.g., state register contents) requires the prior Mp mask to be removed when the register is read, and the next Mn mask to be applied when the register is written. This can be done in operations (e.g., XOR operations) that are not part of the original example design, but requires additional operators as part of the dynamic masking methods being applied. In an aspect, the disclosed methods and systems can be used in dynamic state register masking for each write of an AES E/D operation (e.g., an AES operation) state register. For example, when a state register is loaded, an XOR operation can be performed on the state register and a random number (e.g., a state register mask). In an aspect, the random number (e.g., a state register mask) can be generated by a random number generator. The random number (e.g., a state register mask) can be stored in a state register mask 101$b$. Once the state register mask is used, it can be stored as a prior state register mask Mp in a register for prior state register mask 101$a$. When the state register is retrieved, an XOR operation can be performed on the retrieved state register and the prior state register mask Mp in the register for prior state register mask 101$a$, since an XOR operation was performed on the mask Mp and the clear form of the state register value written in the AES state register 109. In an aspect, a clear form of the state register data (e.g., output of prior mask XOR operator 109$a$) can be created to pass to the AES ShiftRows Operator such that an array of four bytes selected from the AES State Register becomes the Substitution tables 102 inputs. It can be seen that the prior state register mask Mp stored in prior state register mask 101$a$ can be used on the state register output, and the next state register mask Mn stored in the state register mask 101$b$ can be used on the state register input. In an aspect, a new mask can be acquired for each state register write, and the number of masks is unlimited.

As an example, when the tenth output is generated in the AES AddRoundKey XOR operator 108, the tenth output can be masked before being stored in an AES state register 109. For example, an eleventh output can be generated by performing an XOR operation on a fifth random number and the tenth output. As an example, the fifth random number can be a state register mask; the eleventh output can be a masked state register. In an aspect, the eleventh output can be stored in a memory (e.g., AES state register 109). In an aspect, the tenth output can be re-created from its masked form by performing an XOR operation on the fifth random number and the eleventh output. It can be seen that the same mask is needed for storing and retrieving the eleventh output, so that the tenth output can be cryptographic data in clear form.

In an aspect, generating the tenth output (e.g., state register input) and generating the second output or the fourth output (e.g., RAM bank 0, bank 1, respectively) can occur simultaneously. In an aspect, the AES state register 109 can hold the prior round result until all four of column registers 106a through 106d are calculated using whichever RAM bank, bank 0 or bank 1, is enabled for cryptographic operations (e.g., lookup table function in an AES E/D operation). This means that the substitution tables 102 can have 100% availability meaning the re-masking operation does not have to complete prior to an AES E/D operation starting. In another aspect, generating the tenth output (e.g., state register input) and performing the substitution table re-masking operation on either RAM bank 0 or RAM bank1 which generates the second output or the fourth output (e.g., bank 0, bank 1, respectively) can occur simultaneously. In an aspect, while one set of Substitution tables is used for a cryptographic operation (e.g., performing the lookup table function), another set Substitution tables can be generated using a new mask obtained from new mask register 101n. For example, while Bank 0 is used for a cryptographic operation (e.g., lookup table function in an AES E/D) operation), Bank 1 can be generated using a new mask (e.g., next mask Mn). Similarly, while Bank 1 is used for a cryptographic operation (e.g., lookup table function in an AES E/D operation), Bank 0 can be generated with a new mask (e.g., next mask Mn).

In an aspect, the system memory element holding the contents of the AES state array after the AES AddRoundKey function K+D is performed and between AES rounds (e.g., the AES state register 109) can be a CSV register storing a CSV (e.g., AES state register data). In an aspect, Mn can be next CSV mask stored in 101b, and an XOR operation 109b can be performed on Mn and the CSV when the CSV register is written. Additionally, when a CSV register (e.g., AES state register 109) is written. Mn can be moved to prior CSV mask (e.g. Prior State Register Mask 101a) and becomes Mp while a new random number can be acquired from a random number generator and become Mn or next CSV mask. In an aspect, an XOR operation can be performed on the CSV and the next CSV mask when CSV register is written. If "+" denotes the XOR operation such that CSV+Mn is the output of the XOR operation, then a masked CSV is what can be stored in a CSV register (e.g., AES state register 109). When the CSV register is read, an XOR operation can be performed on the stored CSV register data such that the masked CSV+Mp can re-create the clear version of the data from the CSV register, since Mn was moved to Mp as part of the actions included in the write operation. This XOR operation can remove, as opposed to dissolve, the mask since this is an odd number of values—in this case one—that was masked with the fifth random number (e.g., a state register mask) to obtain the tenth output (e.g., AES state register contents in clear form). Since Mp is the same random number as Mn, the XOR operation with the same value twice will return the clear form of the state register data because when Mp=Mn, Mp+Mn=0. Thus, the masked CSV is CSV+Mn. The output of the XOR operation on the output of the CSV register becomes CSV+Mn+Mp=CSV, which is the original CSV returned to clear form. It can be seen from this application of the dynamic masking Odd Example to the AES state register, that the components of the Odd Example with the generalized names can become an integrated component in a hardware design application. Instead of being constructed from existing components as described herein, the configuration of components in the Odd Example can itself become a library component in a Field Programmable Gate Array (FPGA) library. Additionally, the DSP (Digital Signal Processing) hardware macros typically found in larger FPGAs can be configured to perform dynamic masking. If implemented in either manner to make a hard or soft macro in an FPGA, the timing delays added by the data path through the input/writing XOR function and output/reading XOR function can be significantly reduced to make the disclosed methods and systems even more applicable in very high clock-rate designs. Similarly, if the Odd Example function were implemented as a single object in a software OOP Objected Oriented Programming (OOP) design, execution time can be reduced as compared to individual objects for the masking, storing, and un-masking functions. In an aspect, integrating the dynamic masking Odd Example can also be applied to the Even Example and also include scenarios where the CSV register is a CSV RAM in either example.

In an aspect, the duration of each mask of the CSV register as applied to the AES State Register masking can be the time taken to perform one round of an AES E/D operation. Thus, the disclosed methods and systems can enable the data stored in the CSV register to be covered with a new mask for each round of cryptographic operation, while the CSV register output can return the data in CSV register to its clear form. For example, the CSV register data (AES ShiftRows output) can be sent to substitution table input 101 and create four, 4-byte arrays (e.g., words) from the AES state array. The substitution Table input 101 can provide the four words one word (e.g., column) at a time. When this operation occurs, the CSV Register output values can be selected independent of the mask that was used to store the CSV register. The independence from the mask can be based on using the same mask on the output of the CSV Register to return the CSV to its clear form before the value can be used in any cryptographic operations (e.g., another AES round, or transfer to the Data Out Register 110 when the AES E/D operation is complete).

Thus, the disclosed methods and system can exploit a weakness of power analysis attacks, namely, that they need to capture a great number of power signatures when the cryptographic engine is using a specified set of data and the same key. All power analysis attacks, other than simple power analysis, require a statistical analysis of the captured power or electromagnetic (EM) signatures when the cryptographic engine is performing an operation of interest. Many samples are required where the engine is performing the same operation on the same set of data, and higher order attacks against cryptographic processes that may have small number of masks that last for the entire life of the product can take exponentially more samples. In the AES State Register masking application, the CSV can be masked with a new mask for each write of the CSV register. Thus, the power-significant and potentially information leaking event can be performed on data that has been covered with one of $2^{128}$ possible values for, in this case, the 128-bit register being covered. The possibility of capturing enough samples (e.g., the tens or hundreds of thousands) in a power signature analysis is thus reduced if not eliminated.

In an aspect, the length of time a CSV register mask is used can be the duration of one AES E/D operation, as in the case when dynamic masking is applied to the key schedule and round data (see FIG. 4 description), or even no longer than a single AES round calculation, as is the case when the CSV register is the AES State Register as described in FIG. 5, or as many as four AES E/D operations in the case of dynamic masking Substitution Tables (see FIG. 3B description). In an aspect, a new CSV register mask (e.g., the next CSV register mask) can be obtained from a random number generator. In one aspect, the new CSV register can be obtained at the beginning of an AES E/D operation (e.g., only once per AES E/D operation when the CSV memory element is written (e.g. key schedule and round data masking)). In another aspect, the new CSV can be obtained at the end of an AES round which occurs multiple times in an AES E/D operation (e.g., when the CSV register is written (AES State Register masking)). In yet another aspect, the new CSV can be obtained at the completion of a previous masking or re-masking operation (e.g., only every four or less AES E/D operations when the re-masking operation starts (e.g., Dynamic Masking Substitution Tables)). Additionally, with each of these masks changing at different intervals provides added randomness. In an aspect, the start and end times of a set of masks used on any particular AES E/D operation is not easily determined. In each of these applications, the operation can be repeated indefinitely until a threshold is detected. For example, a threshold can be detected when a data stream is processed, wherein the data steam comprises a plurality of data blocks. As another example, a threshold can be detected when a reset command is received. As such, the dynamically changing masks can prevent multiple trace captures with the specific values needed to perform the SPA, DPA. DFA, or DSA attacks.

In an aspect, CSV register masking (e.g., AES state register masking) in a cryptographic engine can be agnostic (e.g., disassociated or not coordinated in any way as compared to Cipher-Block-Chaining (CBC) which requires the encryption and decryption processes to use the same initialization vector) of the masking performed with the associated inverse cryptographic operation. For example, a cryptographic engine configured to perform decryption operations does not need to know about the masks used by the cryptographic engine configured to perform the encryption operations. Similarly, a cryptographic engine configured to perform encryption operations does not need to know about the masks used by the cryptographic engine configured to perform the decryption operations. This agnostic characteristic exists because all cryptographic calculation values and constants used to perform a cryptographic operation (e.g., an AES E/D operation) can be performed on un-masked or clear data, while the resultant CSVs can be stored in a memory (e.g., RAMs or FFs) covered with constantly changing masks. In another aspect, state register masking can be non-synchronized with the beginning or ending of a cryptographic operation (e.g., an AES E/D operation). While CSV register masking (e.g. AES state register masking) must be synchronous to the system clock and the writes to the state register of the cryptographic engine to which dynamic masking is being applied, it is not necessary that CSV register (e.g. AES state register) masking begin at a particular point in the AES E/D operation or occur on every write of the state register. This means that the masks (Mn, Mp) used to cover the state register could be used for multiple state register writes until a threshold is reached, such as a count of the number of times the state register has been written. While it is most desirable to keep this count significantly smaller than the tens or hundreds of thousands of cryptographic operations (e.g., AES E/D operations) required to perform a successful power analysis attack, this non-synchronized and threshold based characteristic allows for a trade-off to be made between reduced power consumption when the mask is changed less frequently (e.g., more AES E/D operations using the same mask set) and more protection against information leakage when the mask is changed more frequently (e.g. less AES E/D operations using the same mask set).

Figure 6:
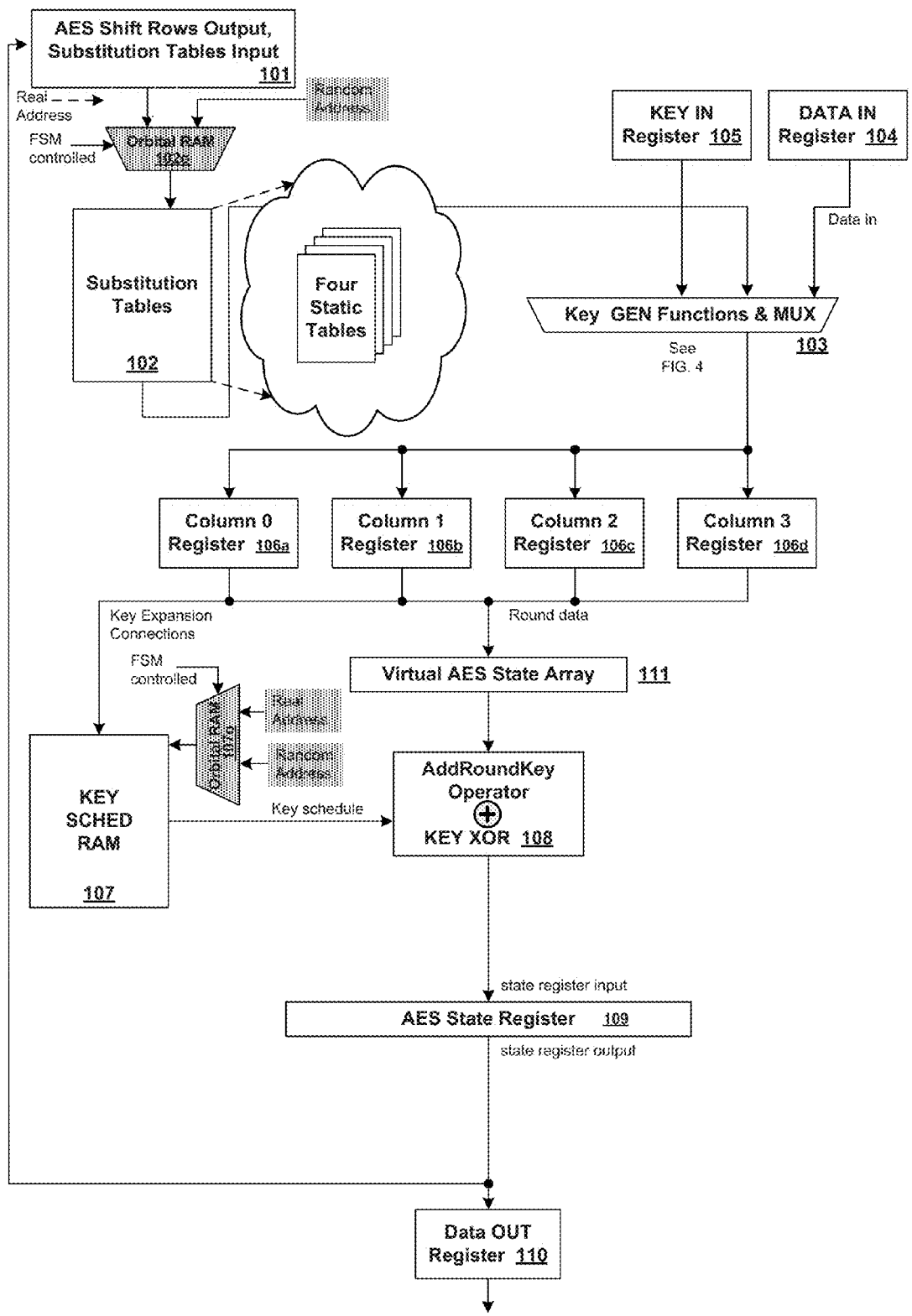
FIG. 6 is a block diagram illustrating another exemplary environment in which the present methods and systems can operate.

FIG. 6 is a block diagram illustrating an exemplary tables-based AES environment with an orbital RAM function in which the present methods and systems can operate. In an aspect, the orbital RAM function can be used on certain memory elements within the cryptographic engine which can be made to perform operations on unimportant or irrelevant data, creating unused results when these memory elements within the cryptographic engine are not being requested to perform real cryptographic operations with real data and required results. Therefore, the orbital RAM function can make it difficult for a power signature analysis attacker to distinguish between a real operation and a non-real operation, thereby hindering the acquisition of meaningful power signature samples where a cryptographic engine is doing the same operation with the same key and a specific data set.

In an aspect, one or more orbital RAM functions can create unused reads of random addresses for each of the RAM elements in a cryptographic engine. As shown in FIG. 6, in an aspect, Substitution tables 102 can be coupled to an orbital RAM function 102o which produces random addresses. Key schedule RAM 107 can be coupled to an orbital RAM 107o which also produces random addresses. By reading random addresses of Substitution tables 102 provided by orbital RAM function 102o and/or reading random addresses of key schedule RAM 107 provided by orbital RAM 107o during clock cycles when the real outputs are not required from these functions, the view from the perspective of the power signature is that the power analysis attacker can no longer distinguish real AES E/D operation key reads from unreal E/D operation key reads, and/or real Substitution table reads from non-real Substitution table reads.

In an aspect, no-operation clocks can be used in the disclosed dynamic data masking. For example, when a no-operation clock edge occurs, no real cryptographic operation can be processed. In this case, the insertion of one or more no-operation clocks can make the cryptographic operation less predictable since a power analysis attacker will be unaware of which clock edge does a real cryptographic operation and which clock edge does not do a real cryptographic operation. In an aspect, the number of no-operation clocks can be varied according to a random function. For example, the number of no-operation clocks can exceed the number of real operation clocks, when the bandwidth capability of the engine sufficiently exceeds the bandwidth needs of the system in which it is implemented. In an aspect, a system employing the dynamic asking methods disclosed herein may require a performance capability of 500 AES E/D operations per second, as an example. If, for example, the cryptographic engine employed was capable of 5000 operations per second, the engine would have 10× (e.g., 10-times) the bandwidth capability required. Thus, there would only be one clock cycle in ten that are required to perform real operations, and the other nine clock cycles can be made no-operation clocks and then used to perform operations on unimportant or irrelevant data, creating unused results. In other words, in addition to the un-used reads of certain memory elements when those memories are not being requested to perform a real operation using real data and required results on real clock cycles, there can now be up to an additional nine no-operation clock cycles where additional operations on unimportant or irrelevant data, creating unused results can also occur. In another aspect, the placement of no-operation clocks within cryptographic operations can be varied according to a random function. For example, the control logic for the cryptographic engine (e.g., FSM or finite state machine) can pick locations in the cryptographic process where no-op clocks are inserted. Configuring a 3-bit counter that employs a parallel load capability used to insert a 3-bit random number, which then counts to a specific value, can be employed to create a control signal that allows the FSM to continue with real operation clock cycles. This 3-bit random number can provide a maximum of eight no-operation clock cycles, with an average of four if the random numbers are sufficiently random, where the additional operations on unimportant or irrelevant data, creating unused results can occur. Adding to maximum of eight non-operation clocks and the one real operation clock yields nine in ten allocated clock cycles, or the 500 required operations per second can be completed in 0.9 seconds. The 500 AES E/D operations per 0.9 seconds can yield a minimum bandwidth capability of 555 AES E/D operations, or 55 AES E/D operations per second as the minimum margin. Additionally, this construct would also create an average of five allocated clock cycles (e.g., one real operation and four non-operation clock cycles), or the 500 required operations per second can be completed in 0.5 seconds. The 500 AES E/D operations per 0.5 seconds yield an average bandwidth capability of 1000 AES E/D operations, or 500 AES E/D operations per second as the average margin. Thus, in both minimum and average margin calculations, the number of non-operation clock cycles exceeds the number of real operation clock cycles per second with the real operation clock cycles having a varying number of non-operation clock cycles between them, making the observable power signature of the real operation clock difficult find. While DFA can convert the time domain power signatures into a frequency domain for analysis, thus attempting to eliminate the variances in the time domain, the power signature of the adjacent, non-operation clock cycles can be made so similar to the real operation clock cycles by applying the dynamic data masking methods of this disclosure that the frequency variance between them can be minimized. Therefore, even for DFA, the non-operation clock cycles can work against the power analysis attacker.

In an aspect, orbital RAM functions and no-operation clocks can be combined to execute pseudo-cryptographic operations on specific no-operation clock edges or on real operation clocks. This can make the real and no-operation clocks nearly indistinguishable from a power signature analysis perspective. Therefore, when no-operation clocks are applied to both real and orbital RAM cryptographic operations, real AES E/D operations and orbital RAM AES E/D operations can be further obscured.

Combining orbital RAM functions and no-operation clocks, cryptographic operations can appear to be random operations by power signature analysis. In an aspect, when orbital RAM functions and no-operation clocks are combined, and when the number of no-operation clocks exceeds the number or real operation clocks, the power signature can be smoothed and contain potentially many more non-used reads as it does real reads, which can make it difficult to find the real read.

In an aspect, a random address with the same number of bits as a real address can be multiplexed via a control signal into an address input of a RAM to which the orbital RAM function is being applied. In an aspect, this can constitute an orbital RAM function (e.g., 102$o$, 107$o$). In an aspect, one or more control signals can be used to determine when the real read is required, and which clock cycles are no-operation clocks cycles and real operation clock cycles. For example, when the methods described in FIGS. 2, 3, 4 are executed on the example tables-based AES design, the real functions required to accomplish an AES E/D operation can be executed on specific clock cycles of a clock schedule. In an aspect, the specific clock cycles can be defined by a random function. As another example, when cryptographic operations that generate clear form or masked contents of the virtual AES State Array 111 (e.g., the ninth output), the clear form or masked round key (e.g., seventh output), which can be read from key schedule RAM 107, is not required to be valid data. It is during this time (e.g. during these clock cycles) that the seventh output can be read, but not used, via orbital RAM 107$o$ according to a random address function as selected by one or more control signals to orbital RAM 107$o$. As another example, a clear form or masked round key (e.g., seventh output) can be retrieved from Key schedule RAM 107 according to a real address function associated with Key schedule RAM 107 when a valid seventh output is required for the AES AddRoundKey operator, which is when an AES state register is about to be written. As another example, no-operation clocks can be implemented during round key retrieval according to a random function.

Thus, the disclosed methods and systems can exploit the weakness of all the attacks in that they all need many captured power signatures when the engine is using the same data and key, no matter how they are analyzed. With the combination of orbital RAM and no-operation clocks, the retrieval of the key schedule values or the Substitution table values, both of which are power significant and thus potentially information-leaking events, are performed on the used and un-used data where the attacker is unable to distinguish between the real cryptographic reads and non-real cryptographic reads. The possibility of capturing enough samples, measured in the tens or hundreds of thousands, can be substantially reduced by virtue of the real operations being difficult or nearly impossible to distinguish from the orbital RAM operations.

In an aspect, the implementation of orbital RAM and no-operation clocks can be repeated indefinitely until a threshold is detected. For example, a threshold can be detected when a data stream is processed, wherein the data steam comprises a plurality of data blocks. As another example, a threshold can be detected when a reset command is received. As such, the real reads and orbital reads can be intermixed constantly, preventing multiple trace captures with the same values needed to perform the SPA, DPA. DFA, or DSA attacks.

In an aspect, the orbital RAM and no-operation clock functions can be agnostic (e.g., disassociated or not coordinated in any way as compared to Cipher-Block-Chaining (CBC) which requires the encryption and decryption processes to use the same initialization vector) of the respective associated inverse cryptographic operation. This means, for example, that the cryptographic engine (e.g., an AES engine) used for decryption does not need to know about orbital RAM reads or times of insertion of no-operation clocks used by the cryptographic engine (e.g., an AES engine) used for the encryption of the data it is receiving. Furthermore, a cryptographic engine (e.g., an AES engine) used for encryption does not need to know about orbital RAM reads or times of insertion of no-operation clocks used by the cryptographic engine (e.g., an AES engine) used for the decryption of the data it is transmitting. This is because orbital RAM and/or no-operation clocks can be executed in a manner so as to not interfere with any of the real cryptographic operations and the resulting block of processed data is the same whether orbital RAM and/or no-operation clocks are employed or not.

Figure 7:
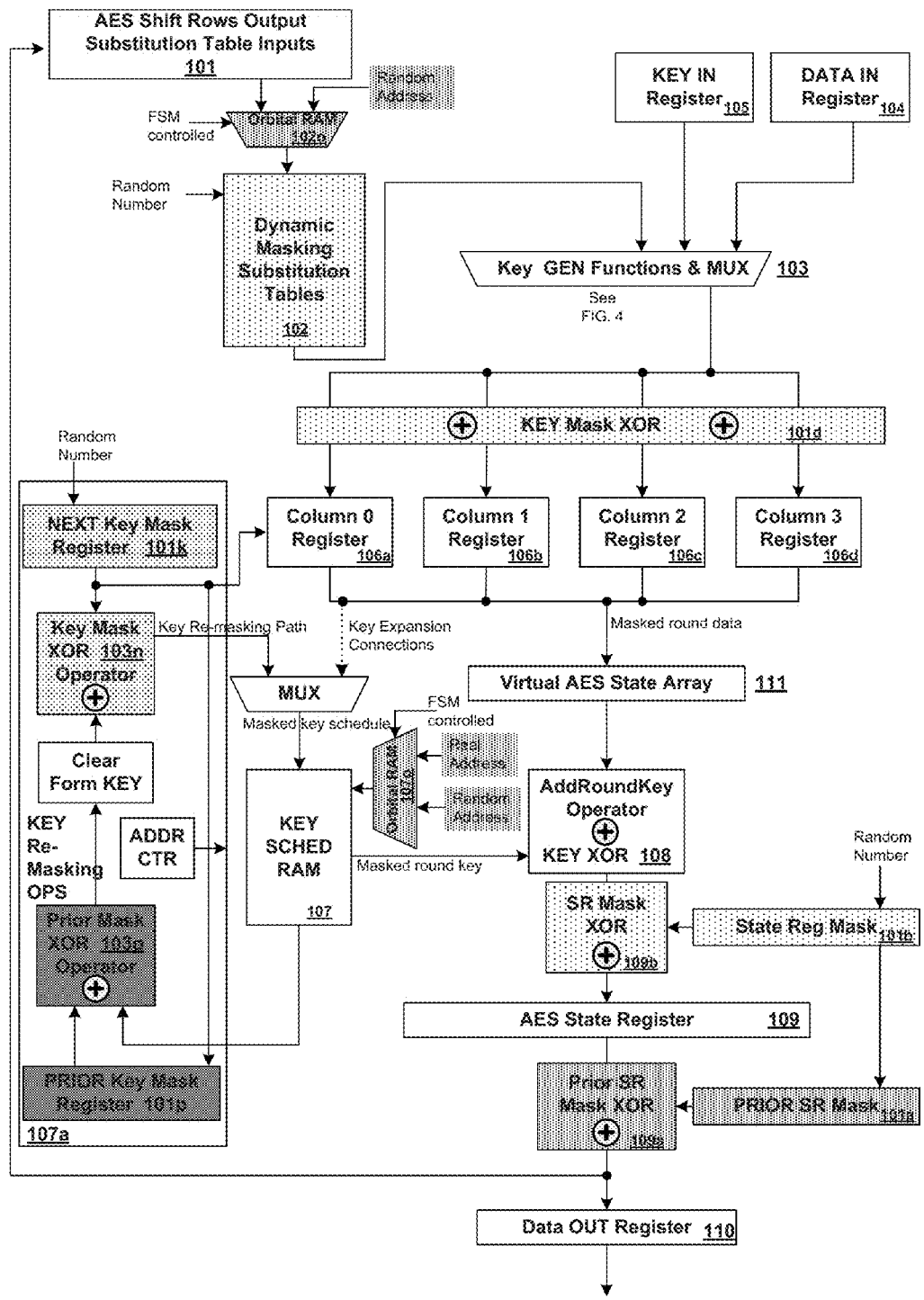
FIG. 7 is a block diagram illustrating yet an exemplary environment in which the present methods and systems can operate.

FIG. 7 is a block diagram illustrating an exemplary tables-based AES environment with dynamic Substitution table masking, dynamic key schedule masking, dynamic state register masking, and orbital RAM in which the present methods and systems can operate. In an aspect, dynamic Substitution table masking, dynamic key schedule masking, dynamic state register masking, orbital RAM functions, and non-operation clock cycles can be implemented in one or more aspects of cryptographic operations. Functions of each module in FIG. 7 are described in tables 1-6.

FIG. 8 is a flowchart illustrating an example method for dynamic data masking. At step 802, a first output can be generated by performing an operation on a first random number and a first data block. In an aspect, the first random number can be a next mask to cover the first data block. In an aspect, the first data block can be a Substitution table (e.g., SubBytes function in AES, FIPS 197, and/or selection functions $S_1$ to $S_8$ in DES or triple DES, FIPS 46-3). In another aspect, the first data block can comprise a table that incorporates a Substitution table, shift row algorithm, and mix columns algorithm in the exemplary tables-based AES design. In another aspect, the first data block can comprise a table that incorporates an inverse Substitution table, inverse shift row algorithm, and inverse mix columns algorithm in the exemplary tables-based AES design. In an aspect, the operation on the first random number and the first data block can comprise an XOR operation on the first random number and the first data block. In an aspect, the first output (e.g., Substitution table covered with a next mask) can be stored in a memory (e.g., RAM). In FIG. 1, the dynamic masking diagram, the first output described above correlates to the stored second output from data source DIN 2, where DIN 2 is system constants table, C007, the next mask is from the next masked register C001n, and the operation is the XOR operation C006n. In FIG. 3B, Substitutions Table Masking, of the exemplary tables-based AES design, there are four instances of this method from FIG. 1, for DIN 2, with one instance applied to each of the four system constants tables (e.g., ROM Tables) according to the four tables in Bank 0 dual-port RAMs 102a, where the masked versions of the four tables in ROM Tables 102s are stored. When the masking of all four tables is complete, next mask immediately becomes prior mask C001p in the diagram of FIG. 1. All masked table entries in Bank 0 dual-port RAMs 102a for all four tables are collectively referred to as the first output in FIG. 3B, meaning step 802 can be repeated for all table entries in each of the four substitution tables of this RAM Bank.

At step 804, a set of first outputs can be retrieved by performing an operation on a second data block. In an aspect, the second data block can be substitution table inputs 101. In another aspect, the operation on the second data block can be a substitution table look-up operation that retrieves the correct first output from all four masked substitution tables in RAM Bank 0. As an example, a set of first outputs can be four outputs.

At step 806, a second output can be generated by performing an operation on one or more of the retrieved first outputs. In an aspect, the operation performed on one or more of the retrieved first outputs (e.g., a set of four of the retrieved first outputs), which results in the second output, can be an XOR operation. Furthermore, the XOR operation can be a system XOR operator C005 as shown in FIG. 1, dynamic masking diagram in the Even Example. In this case, two instances of the Even Example are used as follows: Bank 0 Table 1 and Table 3 outputs can be FIG. 1 DIN 1 inputs, while Bank 0 Table 2 and Table 4 outputs can be FIG. 1 DIN 2 inputs. With this even number of inputs to each of the Even Example instances in this step, both of which are masked with the same mask value, each Even Example instances can have the system XOR operation produce the XOR result of the underlying data in DIN 1 and DIN 2 while, at the same time, removing the mask from DIN 1 and DIN 2. The results of these two Even Example instances can also have an XOR operation applied to them which results in the same output as would have occurred if the Bank 0 RAM tables 1 through 4 were not masked (e.g., the original substitution table values in clear form). Additionally, in the exemplary tables-based AES design FIG. 3B, the second output is the result of a four input XOR operation, with one input coming from each of the four masked tables in Bank 0 dual-port RAMs 102a. As an example, the second outputs can be intermediate CSVs, which for the example AES design shown in FIG. 4, can be the Virtual AES State Array 111. For example, the Virtual AES State Array 111 can comprise intermediate AES data which can comprise four×32-bit columns (e.g., column 0 register 106a, column 1 register 106b, column 2 register 106c, column 3 register 106d). In an aspect, the second outputs can be un-masked data, because the four×32-bit retrieved copies of the first outputs can all be covered with the same mask M (e.g., Mp or Mn). The mask can be dissolved in the second output generation process. Specifically, T1. T2, T3, and T4 can be four tables in the first output (e.g., bank 0). For a standard tables-based AES without dynamic masking, a column output can be T1+T2+T3+T4. With dynamic masking applied to the contents of each of the four tables, the equation becomes (M+T1)+(M+T2)+(M+T3)+(M+T4)=T1+T2+T3+T4, wherein M+T1 can be an XOR operation performed on the Substitution table T1 and the mask M, M+T2 can be an XOR operation performed on the Substitution table T2 and the mask M, M+T3 can be an XOR operation performed on the Substitution table T3 and the mask M, M+T4 can be an XOR operation performed on the Substitution table T4 and the mask M. It can be seen that the mask M can dissolve in a standard XOR operation of the output values of the four tables because M+M=0. Thus there is no change to the operation performed on the output of the AES round data as compared to a standard tables-based AES implementation. As an example, the second output can be the result of the four-input, system XOR operation performed on the four Bank 0 (e.g., T1, T2, T3, T4) outputs, shown as four tables in FIG. 3B.

In an aspect, the architecture of the AES function can vary from one implementation to another and can be processed as one 32-bit column output at a time using a single instance of Bank 0 RAM containing the four tables, T1, T2, T3 and T4, whether or not dynamic masking is employed. Therefore, for a 128-bit first data block, another implemented choice could be four instances of Bank 0 RAM, each containing four tables, to form the single 128-bit value contained in the first output all at one time instead of four times through a single instance of the Bank 0 RAM. In another aspect, the AES function can be processed as two of four×32-bit columns at a time. Therefore, for a 128-bit first data block, there can be two Bank 0 RAM sets, each containing the four tables, to form the first output. In another aspect, AES function can be processed as four×32-bit columns at a time, as described above, which is the implementation of the exemplary AES design used in this disclosure.

At step 808, a third output can be generated by performing an operation on a second random number and the first data block. As described in step 802 and FIG. 1 that when the masking of all four tables in a RAM Bank is complete, next mask C001n used to perform the masking operation immediately becomes prior mask shown as C001p in FIG. 1.

Therefore, in an aspect, the second random number can also be a next mask, but which has a different value than what had been next mask in step 802, to cover the first data block. In an aspect, the first data block can be a Substitution table (e.g., SubBytes function in AES, FIPS 197, and/or selection functions $S_1$ to $S_8$ in DES or triple DES, FIPS 46-3). In another aspect, the first data block can be a table that incorporates a Substitution table, shift row algorithm and mix columns algorithm in AES. In another aspect, the first data block can be a table that incorporates an inverse Substitution table, inverse shift row algorithm, and inverse mix columns algorithm in. In an aspect, the operation on the second random number and the first data block can be an XOR operation. In an aspect, the third output (e.g., Substitution table covered with a next mask) can be stored in a memory (e.g., RAM). In FIG. 1, the dynamic masking diagram, the third output described above correlates to the stored second output from data source DIN 2, where DIN 2 can be system constants table, C007, the next mask is from the next masked register C001n, and the operation is the XOR operation C006n. In FIG. 3B, Substitutions Table Masking, of the exemplary tables-based AES design, there are four instances of this method from FIG. 1, dynamic masking Concepts Diagram for DIN 2, with one instance applied to each of the four system constants tables (e.g., ROM Tables) according to the four tables in a second ram bank, such as Bank 1 dual-port RAMs 102b, where the masked versions of the four tables in ROM Tables 102s can be stored. When the masking of all four tables is complete, next mask immediately becomes prior mask C001p in the diagram of FIG. 1, although in the Substitution Tables Masking, prior mask is not required in this exemplary AES design. All masked table entries in Bank 1 dual-port RAMs 102b for all four tables can be collectively referred to as the third output in FIG. 3B, meaning step 808 can be repeated for all table entries in each of the four substitution tables of this RAM Bank.

At step 810, a set of retrieved third outputs can be generated by performing an operation on the second data block. In an aspect, the second data block can be substitution table inputs 101. In another aspect, the operation on the second data block can be a substitution table look-up operation that retrieves the correct third output from all four masked substitution tables in a second bank, such as RAM Bank 1.

At step 812, a fourth output can be generated by performing an operation on one or more of the retrieved third outputs. As an example, the operation can be performed on one or more of the four retrieved third outputs, which results in the fourth output, can be an XOR operation. Furthermore, this XOR operation can be a system XOR operator as shown in FIG. 1, dynamic masking diagram in the Even Example. In this case, two instances of the Even Example are used as follows: Bank 1 Table 1 and Table 3 outputs can be FIG. 1 DIN 1 inputs, while Bank 1 Table 2 and Table 4 outputs can be FIG. 1 DIN 2 inputs. With this even number of inputs to each of the Even Example instances in this step, both of which are masked with the same mask value, each Even Example instances can have the system XOR operation produce the XOR result of the underlying data in DIN 1 and DIN 2 while, at the same time, removing the mask from DIN 1 and DIN 2. The results of these two Even Example instances also have an XOR operation applied to them, which results in the same output as would have occurred if the Bank 1 RAM tables 1 through 4 were not masked (e.g., the original substitution table values in clear form). Additionally, in the exemplary tables-based AES design FIG. 3B, the fourth output is the result of a four input XOR operation, with one input coming from each of the four masked tables in Bank 1 dual-port RAMs 102b. As an example, the fourth output can be intermediate CSVs, which for the example AES design shown in FIG. 4, can be the Virtual AES State Array 111. For example, the Virtual AES State Array 111 can comprise intermediate AES data which can comprise four×32-bit columns (e.g., column 0 register 106a, column 1 register 106b, column 2 register 106c, column 3 register 106d). In an aspect, the fourth outputs can be un-masked data by virtue of the four tables of third output (e.g., bank 1) all having the same mask: therefore, the mask can be dissolved. Specifically, T5, T6, T7, and T8 can be four tables of the third output (e.g., bank 1). For a standard tables-based AES without dynamic masking, a column output can be T5+T6+T7+T8. With dynamic masking, wherein a mask M is applied to the contents of each of the four tables and "+" can denote the XOR operation, the equation becomes (M+T5)+(M+T6)+(M+T7)+(M+T8)=T5+T6+T7+T8=Column Output. It can be seen that the mask M can dissolve in a standard XOR operation of the output of the four tables values because M+M=0. Thus, there is no change to the operation performed on the output of the tables as compared to a standard tables-based AES implementation.

In an aspect, the architecture of the AES function can vary from one implementation to another and can be processed as one 32-bit column output at a time using a single instance of Bank 1 RAM containing the four tables T1, T2, T3 and T4, whether or not dynamic masking is employed. For a 128-bit data, another implemented choice could be four instances of Bank 1 RAM, each containing four tables, to form the single 128-bit value contained in the third output all at one time instead of four times through a single instance of the Bank 1 RAM. In another aspect, the AES function can be processed as two of four×32-bit columns at a time. Therefore, for a 128-bit data, there can be two Bank 1 RAM sets, each containing the four tables to form the third output. In another aspect, AES function can be processed as four×32-bit columns at a time, as described above, which is the implementation of the exemplary AES design used in this disclosure.

At step 814, a fifth output can be generated by multiplexing the second output and the fourth output. In an aspect, the fifth output can be selected from the second output or the fourth output, depending on the multiplexing. The fifth output can be stored in the column 0 register 106a, column 1 register 106b, column 2 register 106c, and column 4 register 106d, as shown in FIGS. 4, 5, 6, 7.

In an aspect, since the fifth output is a CSV in clear form, it can be stored after further masking. Referring to FIG. 1, the dynamic masking Concepts Diagram, masking the fifth output would be one input of the Even Example (e.g., input DIN 1) and the system memory element 1 C002 would be the column 0-3 registers 106a-d. Referring to the exemplary AES design as shown in FIG. 4 and how to apply the FIG. 1 Even Example to it, for example, a sixth output can be generated by performing an XOR operation on a third random number (e.g., a key mask) and the fifth output, and the sixth output can be stored. The fifth output in masked form (e.g., the sixth output) will later undergo system operation C005 in FIG. 1 (e.g., an XOR operation) with the round key that has been masked with key mask (e.g., DIN 2 in FIG. 1 that is masked with the same mask as DIN 1, and stored in system memory element 2 C003). Hence the selection of the same mask (e.g., the third random number, aka key mask) for the fifth output and the retrieved seventh output from key schedule RAM 107 in FIG. 4 allows for the mask to be dissolved by the system XOR operation rather than removed by an additional XOR operation.

In an aspect, step 802 and one or more of the steps 810, 812 and step 814 can occur simultaneously and, for this disclosure, can be referred to as Bank 0 Masking-Bank 1 lookup-operation enabled; similarly, the combination of steps 804, 806 and step 814 can occur simultaneously with step 808, and for this disclosure, can be referred to as Bank 1 Masking-Bank 0 lookup-operation enabled. This simultaneous aspect is possible because there are two RAM banks employed to contain the masked substitution table constants. Thus, after the first RAM bank (e.g., Bank 0 RAM) consisting of four tables is masked, it is available for cryptographic functions (e.g., lookup table operations) while the other RAM bank (Bank 1 RAM), also consisting of four tables, undergoes the masking operation. As soon as the second RAM bank is finished being masked, it is available for cryptographic functions while the masking, or now re-masking, operation moves back to the first RAM bank. Therefore, there is 100% availability of the substitution function while the underlying lookup table constants are continually masked and re-masked. The corollary to the simultaneously operating steps is that step 802 and steps 804 and 806 can be mutually exclusively executed; similarly, step 808 and steps 810 and 812 can be mutually exclusively executed. In an aspect, the second RAM bank would not be required if the throughput requirement of the cryptographic engine compared to its throughput capability was such that the substitution table function did not require 100% availability.

In an aspect, the first random number and the second random number in each round of RAM bank masking can be generated by a random number generator and updated constantly each time a RAM bank masking operation completes. In an aspect, this makes the values retrieved from each RAM bank for the same substitution input value, or set of values, constantly changing by virtue of the constantly changing masks. In an aspect, the Bank 0 Masking-Bank 1 lookup-operation enabled set of steps and Bank 1 Masking-Bank 0 lookup-operation enabled set of steps can be repeated until a threshold is detected. As an example, the threshold can be detected when a data stream is processed, wherein the data steam comprises a plurality of data blocks. As another example, the threshold can be detected when a reset command is received.

In an aspect, steps 802 to 814 can be executed on specific clock cycles of a clock schedule. In another aspect, the specific clock cycles can be defined by a random function. For example, no-operation clocks can be used as often as after each execution of step 806 or 812. Since steps 804 and 806 or steps 810 and 812 occur on a single clock cycle, and the RAM bank enabled for cryptographic operations (e.g., AES E/D operations) produces results which are relied upon and necessary for the correct cryptographic result on operational clock cycles, no-operation clock cycles can be applied between each of these necessary executions to produce un-used results from the RAM bank enabled for cryptographic operations that are not relied upon for the cryptographic operation being performed. During these no-operation clock cycles, the combination of steps 804 and 806 or 810 and 812 occur, but the second or fourth outputs are un-used. The RAM bank undergoing the re-masking operation is un-affected by the no-operation clocks and the re-masking continues the same as it would if there were not any no-operation clocks. In an aspect, the number of no-operation clocks can be varied according to the random function. In another aspect, the placement of no-operation clocks within cryptographic operations can be varied according to the random function.

In an aspect, the data processing in steps 804, 806, 810, 812, and 814 can be executed as an orbital RAM. For example, Substitution tables 102 in FIG. 7 can be coupled to an orbital RAM 102o with random addresses. When cryptographic data (e.g., fifth output) is read from Substitution tables 102 and produces results which are relied upon and necessary for the correct cryptographic result, the fifth output can be read through an orbital RAM 102o according to a cryptographically significant address; similarly, when the fifth output is read but the read result is un-used and not relied upon for the cryptographic operation being performed, the fifth output can be read through an orbital RAM 102o according to a random address function. Therefore, the power analysis attacker observes a power signature where it is no longer possible to distinguish real reads generated in steps 802 to 814 (e.g., fifth output) from non-real reads.

At step 816, a sixth output can be generated by performing an XOR operation on a third random number (a mask) and the fifth output. At step 816, during a cryptographic operation (e.g., an AES E/D operation), a sixth output can be generated during non-initial rounds (subsequent rounds) by performing an operation (e.g., and XOR operation) on fifth output as generated 32-bits at a time.

At step 818, the sixth output can be stored. As an example, the sixth output can be stored in Column 0-3 registers to form a 128-bit result.

At step 820, a seventh output can be generated by performing an XOR operation on a fourth random number and a third data block. In an aspect, before an AES E/D operation can occur in the exemplary design, the 128-, 192-, or 256-bit key input 105 can undergo the key expansion function where the round keys are generated to form a complete schedule for a subsequent AES E/D operation. For this example, the input and round key can be a 128-bit data block, and the fourth random number can be a 128-bit key mask. In an aspect, the seventh output (e.g., masked round key) can be stored in Key schedule RAM 107. During key expansion in the exemplary AES design, a seventh output (e.g., masked round key) can be generated by performing an operation (e.g., and XOR operation) on a fourth random number (e.g., key mask) and a third data block (e.g., input cryptographic key). When the key expansion process continues for subsequent rounds, the fifth output can be the next key word which can be generated from the prior round key as held in Column 0-3 registers, while keeping the intermediate 32-bit results masked with the appropriate 32-bit portion of key mask, as they are generated and shifted through the Column 0-3 Registers. The masked 128-bit key schedule results can be stored in Key schedule RAM 107.

At step 822, the seventh output can be retrieved. In an aspect, prior to executing a cryptographic operation (e.g., an AES E/D operation in the exemplary AES design), a key schedule re-masking operation can be performed by retrieving the seventh output (e.g., masked round keys) from Key schedule RAM 107. The prior mask Mp can be removed by performing an operation (e.g., an XOR operation) on a masked round key and Mp, then apply a next mask Mn to the round key in clear form via an operation (e.g., an XOR operation) on Mn and the round key in clear form, and re-write the re-masked round key masked with Mn to the same memory location from which it was retrieved.

In an aspect, the key schedule can be generated one word (32-bits) at a time. For masking a 128-bit round key schedule using this approach, an appropriate 32-bit portion of a 128-bit key mask Mn can be used to mask each 32-bit portion (e.g., a word) of the round key. In an aspect, the seventh output (e.g., 128-bit masked round keys) for this one particular execution of the key expansion process can all be masked with the same key mask value when generated and then stored as 128-bit values in key schedule RAM 107. For the Gladman tables-based AES example design in this disclosure, the dynamic masking methods applied during the creation of each 32-bit word of the round key during the key expansion process are based on the Odd Example in FIG. 1, the dynamic masking Concept Diagram. This is because the four words of each round key, as they are shifted through the column registers 106a through 106d require the prior 32-bit portion of the Mn mask to be removed and the next 32-bit portion of the Mn mask to be applied. This is done in an operation (e.g., an XOR operation) that is not part of the original example design, but requires an additional operator as part of the dynamic masking methods being applied. As an example of dynamic key masking during the key expansion and storing operation, a seventh output (e.g., masked round key that will be stored in key schedule RAM 107) with the same bit length as the input key 105 can be generated as follows. The initial round key is the input key 105, so the seventh output for the initial key expansion round, which simply creates a masked version of the input key, is generated by performing an operation (e.g., an XOR operation performed in Key Mask XOR operator 10d) on a fourth random number (e.g., key mask Mn stored in key mask register 101k) and a third data block (e.g., a input key). For the subsequent key expansion rounds, the seventh output is generated by performing an operation (e.g., an XOR operation performed in Key Mask XOR operator 101d) on a fourth random number (e.g., key mask Mn stored in key mask register 101k) and a third data block (e.g., a round key) as generated 32-bits (e.g., one word) at a time by Key Generation Functions 103, shifted into Column Registers 106a-106d one word at a time to form 128-bit masked key schedule entry for one round, and then stored as a 128-bit value in key schedule RAM 107 for all entries forming the full key schedule for an AES E/D operation. Note that the column registers 106a-106d in exemplary AES design, which are used to save the four instances of the sixth output during an AES (EFD) operation, are re-configured for the key expansion calculation to be a 128-bit shift register that moves the data by 32-bits (e.g., one word) at a time during the key expansion operation.

Mathematically, given the following definitions:

For Kin=Key In Register 105 (e.g. third data block), and next key mask Mn 101k consisting of four words as the concatenation Mn={Mn3, Mn2, Mn1, Mn0} that acts on Kin and round key according to Key Generator functions and multiplexor 103, and round j where j=1 to Nr where Nr is as defined in FIPS 197 (e.g., Nr=4 for key length of 128 bits), and column i, for i=0 . . . 3, and + denotes the XOR function (e.g., Key Mask XOR operator 101d in FIG. 3), and $Mni+Mni=0$, Then the dynamic masking mathematics during key expansion for the initial 128-bit masked round key K appears as:

K=Kin+Mn; The 128-bit result is then stored in Key schedule RAM 107.

K can also be expressed as the concatenation of the column components:

$K=\{KinC3+Mn3, KinC2+Mn2, KinC1+Mn1, KinC0+Mn0\}$

Mathematically, the dynamic masking mathematics during, the key expansion of subsequent rounds, given the same definitions as above for the initial round key, appears as follows:

For round key K consisting of four words as the concatenation Kj={Kc3, Kc2, Kc1, Kc0} where Kj is the round j key and Kci is the key word in Column i Register for i=0 . . . 3, and where masked round key K consisting of four words can be expressed as the concatenation:

$Kj=\{Kc3+Mn3, Kc2+Mn2, Kc1+Mn1, Kc0+Mn0\}$;

Then the shift of the round key word requiring the removal of Mp (for all columns except Column 0 Register 106a because the fifth output is in clear form (e.g., unmasked) so there is no prior mask to remove) and the application of Mn yields the four equations $Kc0=$(fifth output)$+Mn0$; (e.g., no mask removal)

$Kc1=Kc0+Mn0+Mn1$; or in terms of the equation for $Kc0$, $Kc1=$(fifth output)$+Mn0)+Mn0+Mn1$; (removes $Mn0$ and applies $Mn1$)

$Kc2=Kc1+Mn1+Mn2$; or in terms of the equation for $Kc0$, $Kc2=((5^{th}\_output)+Mn0)+Mn0+Mn1)+Mn2$; (removes $Mn0$ and $Mn1$, and applies $Mn2$)

$Kc3=Kc2+Mn2+Mn3$; or in terms of the equation for $Kc0$, $Kc3=(((5^{th}\_output)+Mn0)+Mn0+Mn1)+Mn+Mn2)+Mn2+Mn3$;

(removes Mn0, Mn) and Mn2, and applies Mn3)

More generally for i=0 . . . 3

$Kci=Kc(i-1)+Mn(i-1)+Mn(i)$, where Kc(i−1) for i=0 is the fifth output and Mn(i−1) for i=0 is 0.

In an aspect, the dynamic masking principles can be applied to a previously generated key schedule. This method can be referred to as Key Schedule Re-Masking and, in an aspect, can occur at step 822 before an encryption or a decryption operation, so that each time the round keys are retrieved during an AES E/D operation, they are retrieved with a different and random mask value. This accomplishes the purpose of creating a power signature for this operation that appears based on only random numbers, since the storing and retrieval of CSVs are always performed on masked values. In an aspect, the application of the dynamic masking principles to this Key Schedule Re-masking function is according to the Odd Example method shown in FIG. 1. This is because each time the CSV(s) are written, they are written to memory covered with a next mask which, in turn, becomes prior mask at the time of the write by being saved in a prior mask register. Prior mask is then available for the mask removal operation when the retrieved value must be presented in clear form (e.g., the next time this key schedule is re-masked). Mathematically, a round key schedule K, can be stored with a prior key mask Mp, which becomes round key covered with a prior key, K+Mp. When the 128-bit round key K is being re-masked after it has been generated as part of a key schedule and prior to being used in an AES E/D operation, during key schedule re-masking, K+Mp can be read from a memory (e.g., Key schedule RAM 107), a first XOR operation can be performed on K+Mp and the prior key mask Mp, which can be K+Mp+Mp, and a second XOR operation can be performed on K+Mp+Mp and a next key mask Mn, which can result in K+Mp+Mp+Mn=K+Mn. Round key covered with next mask (e.g., K+Mn) can be stored in a memory (e.g., key schedule RAM 107) for the eminent execution of the next AES E/D operation.

In an aspect, the next key mask Mn (e.g. a 128-bit random number) can be saved in the key mask register 101$k$, and a prior mask Mp (e.g., a 128-bit random number) can be saved in a prior key mask register 101$p$. In an aspect, the number of masks is unlimited and a new key mask can be acquired for each cryptographic (e.g., AES E/D) operation as the next key mask Mn.

At step 824, an eighth output can be generated during the initial round by performing an operation (e.g., an XOR operation) on a fourth data block (e.g., the input data to be cryptographically processed in the initial round) and a fourth random number (e.g., the next key mask used in step 822 to re-mask the key schedule). As an example, the fourth data block can be the input data to the cryptographic (e.g., AES) engine, shown as Data In register 104. As another example and pertaining to the subsequent rounds of a cryptographic operation (e.g., an AES operation, the sixth output that can be generated by using the results of the first round as stored in the AES State register 109 as the fourth data block and performing a similar operation (e.g., XOR operation) as was performed for the initial round. The difference for the subsequent rounds is that the masked, 128-bit result stored in Column 0-3 registers is generated one 32-bit word at a time, and must use the appropriate portion of the same fourth random number.

At step 826, a ninth output can be generated by performing a multiplexing operation between the sixth output and an eighth output. A ninth output (e.g., a virtual AES state array) can be generated by performing an operation (e.g., a multiplexor operation) that selects between the eighth output (e.g., the initial round using masked input data) or the sixth output (e.g., the subsequent rounds using masked column outputs) as the operation inputs.

As an example, the ninth output can be generated by performing an operation (e.g., a multiplexor operation) between the eighth output for the initial round and the sixth output for the subsequent to form the Virtual AES State array 111. Mathematically, in either the initial or subsequent round cases, the fourth data block can be denoted by D. The fourth random number can be denoted by Mn. Mn can be a next key mask retrieved from the key mask register 101$k$. Mn is the same mask to cover the key schedule in step 802. The operation can be an XOR operation. In an aspect, the dynamic data masking operation performed on the fourth random number and the fourth data block can result in D+Mn.

At step 828, a tenth output can be generated by performing an XOR operation on the seventh output and the ninth output. As an example, the operation is an XOR operation. In an aspect, a tenth output can be generated by performing an operation (e.g., an AES AddRoundKey function which is an XOR operation) on the retrieved, round appropriate seventh output (e.g., masked round key) and the ninth output (e.g., round appropriate data just prior to the AES AddRoundKey function). As an example, the tenth output can be the output of the AES AddRoundKey function which becomes the state register input data. In an aspect, the tenth output can be state register data in clear form (e.g., K+D). Mathematically, for each round result Rr=(K+Mn)+(D+Mn)=K+D. The Mask Mn can dissolve in XOR operation of the round data and key schedule value because Mn+Mn=0.

Thus there is no change to the operation performed on the output of the column registers as compared to a standard tables-based AES implementation. In an aspect, the tenth output can be masked before stored in a state register (e.g., AES state register 109).

At step 830, an eleventh output (e.g., masked state register) can be generated by performing an XOR operation on a fifth random number (e.g., state register mask) and the tenth output (e.g., state register in clear form). In an aspect, the application of the dynamic masking principles to the state register is according to the Odd Example in FIG. 1. In an aspect, an eleventh output can be generated by performing an operation (e.g., an XOR operation) on the tenth output (e.g.; output of the AES AddRoundKey XOR operator 108) and a fifth random number. When writing a state register, a new next mask can be captured in the State Register mask 101$b$ in FIG. 5, while writing the contents of the State Register mask register to the prior State Register mask 101$a$ (e.g., Mp) register.

In an aspect, the eleventh output can be stored in a memory (e.g., AES state register). As such, the tenth output (e.g., state register in clear form) can be retrieved by performing an XOR operation on the fifth random number (e.g., state register mask) and the eleventh output (e.g., masked state register). In other words, the same state register mask can be used for storing and retrieving the tenth output, so that cryptographic operation can be performed on data in clear form.

In an aspect, steps 820 to 824 can be repeated until a threshold is detected. For example, the threshold can be detected when a data stream is processed, wherein the data steam comprises a plurality of fourth data blocks (e.g., round keys). In an aspect, the fourth random number can be the same random number in each round of steps 822 to 824.

In an aspect, the steps 822 to 828 can occur simultaneously. In an aspect, the corollary to these simultaneously operating steps is that neither step 820 nor step 822 can be executed concurrently with steps 824 to 830, and step 820 and 822 can be executed in a mutually exclusive fashion. In an aspect, after step 802 and step 806 are executed over the full constants table range and stored in RAM for the first time, steps 820 to 830 can be executed. After this, in another aspect, the steps 820 to 830 and either the steps for Bank 0 Masking-Bank 1 lookup-operation enabled (e.g., step 802 and the combination of steps 810, 812 and step 814) or the steps for Bank 1 Masking-Bank 0 lookup-operation enabled (e.g., step 808 and the combination of steps 804, 806 and step 814) can occur simultaneously.

In an aspect, steps 820 to 830 can be executed on specific clock cycles of a clock schedule. In another aspect, the specific clock cycles can be defined by a random function. For example, no-operation clocks can be used in the steps 820 to 828. For example, when a no-operation clock edge occurs, no steps in 820 to 828 can be processed on the clock edge. In an aspect, the number of no-operation clocks can be varied according to the random function. In another aspect, the placement of no-operation clocks within cryptographic operations can be varied according to the random function.

In an aspect, the data processing in steps 820 and 824 can be executed as an orbital RAM. For example, Key schedule RAM 107 can be coupled to an orbital RAM 107$o$ with random addresses. When cryptographic data (e.g., seventh output) is read from Key schedule RAM 107 and produces results which are relied upon and necessary for the correct cryptographic result, the seventh output can be read through an orbital RAM 107$o$ associated with the Key schedule RAM 107 according to a cryptographically significant address: similarly, when the seventh output is read but the read result is un-used and not relied upon for the cryptographic operation being performed, the seventh output can be read through an orbital RAM 107*o* according to a random address function. Therefore, the power analysis attacker observes a power signature where it is no longer possible to distinguish between real reads generated in steps 820 or 824 (e.g., seventh output) from non-real reads.

In an aspect, the length of time each key mask (e.g., Mp, Mn) used can be the number of clocks it takes to perform one cryptographic operation (e.g., one AES E/D operation). As an example, a 128-bit random number can be divided into four×32-bit portions, and the four instances of the intermediate CSVs (e.g., fifth output resulting from the last value stored state register after the initial round of this AES E/D operation) can comprise the contents of the four column registers. In an aspect, the CSV being written to the column register can be masked by the respective appropriate 32-bit portion of the 128-bit key mask before being stored. Thus, the four 32-bit column registers that together make the 128-bit ninth output (e.g., virtual AES state array 111 in FIG. 4 containing round appropriate data) and the key schedule (e.g., the data block being the retrieved copy of the seventh output) for each cryptographic round (e.g. a single AES round during an AES E/D operation) can both be covered with the same mask (e.g., the fourth random number, aka key mask). As such, when an operation (e.g. the AES AddRoundKey function comprised of an XOR operation) is performed on round data D masked with mask Mk and the key schedule K masked with mask Mk, the same result will be obtained as in a standard AES AddRoundKey function, and the mask can be dissolved.

In an aspect, a new key mask (e.g., next key mask) Mn can be obtained from a random number generator at the beginning of an operation (e.g., an AES E/D operation). The operation can repeat ad infinitum until an encryption engine is reset. As such, the mask can be constantly changing thus preventing the multiple trace captures with the same set of values needed to perform the SPA, DPA, DFA, or DSA attacks.

In an aspect, the key masking operation can be agnostic (e.g., disassociated or not coordinated in any way as compared to Cipher-Block-Chaining (CBC) which requires the encryption and decryption processes to use the same initialization vector) of the respective associated inverse cryptographic operation. This means, for example, that the cryptographic engine (e.g., an AES engine) used for decryption does not need to know about whether the key masking operation is employed in, or the masks used if key masking is employed by, the cryptographic engine (e.g., an AES engine) used for the encryption of the data it is receiving. Furthermore, a cryptographic engine (e.g., an AES engine) used for encryption does not need to know about whether the key masking operation is employed in, or the masks used if key masking is employed by, the cryptographic engine (e.g., an AES engine) used for the decryption of the data it is transmitting. This is because orbital RAM and/or no-operation clocks can be executed in a manner so as to not interfere with any of the real cryptographic operations and the resulting block of processed data is the same whether orbital RAM and/or no-operation clocks are employed or not to the associated cryptographic function. This is because all key generation operations at step 820 can be performed on unmasked or clear data, while the resultant values can be stored in RAMs or FFs covered with the mask. Additionally, the cryptographic function performed in step 820 creating Column 0-3 register results are designed to mask this data with the same mask used step 818. Furthermore, step 828 performed by the AES AddRoundKey XOR operator 108 in FIG. 4 can therefore be performed on inputs masked with the same value resulting in the mask being dissolved. The cryptographic functions can be performed on CSVs in clear form such that there is no difference in the cryptographic results by employing the disclosed dynamic data masking methods.

FIG. 9 is a flowchart illustrating another example method for dynamic data masking. At step 902, a first masked cryptographically sensitive value (CSV) can be generated by performing an XOR operation on a first random number and a first cryptographically sensitive value. As an example, the first random number can be a next mask. The first CSV can be a key, and the first masked CSV can be a masked key. In an aspect, before an AES E/D operation can occur in the exemplary design, the 128-, 192-, or 256-bit key can undergo the key expansion function where the round keys are generated to form a complete schedule for a subsequent AES E/D operation. As an example, the round key can be a 128-bit data block, and the first random number can be a 128-bit key mask. In an aspect, the first masked CSV output (e.g., masked round key) can be stored in Key schedule RAM 107.

In an aspect, key schedule can be generated one word (32-bits) at a time. For masking a 128-bit round key schedule using this approach, an appropriate 32-bit portion of a 128-bit key mask Mn can be used to mask each 32-bit portion (e.g., a word) of the round key. In an aspect, the seventh output (e.g., 128-bit masked round keys) for this one particular execution of the key expansion process can all be masked with the same key mask value when generated and then stored as 128-bit values in key schedule RAM 107. For the Gladman tables-based AES example design in this disclosure, the dynamic masking methods applied during the creation of each 32-bit word of the round key during the key expansion process are based on the Odd Example in FIG. 1, the dynamic masking Concept Diagram. This is because the four words of each round key, as they are shifted through the column registers 106*a* through 106*d* require the prior 32-bit portion of the Mn mask to be removed and the next 32-bit portion of the Mn mask to be applied.

At step 904, a second masked cryptographically sensitive value (CSV) can be generated by performing an XOR operation on the first random number and a second cryptographically sensitive value. As an example, the first random number can be a next mask. The second CSV can be a data block, and the second masked CSV can be a masked data block. As an example, the second CSV (e.g., input data) can be a 128-bit data block, and the first random number can be a 128-bit key mask. In an aspect, the second masked CSV output (e.g., masked input data) can be stored in another system memory element, such as the Column Registers 106*a* through 106*d* in the exemplary AES design. In an aspect, the first masked CSV output and the second masked CSV output can be stored in a same memory element. As an example, the second CSV (e.g., data block) can be the input data to the cryptographic (e.g., AES) engine, shown as Data In register 104.

At step 906, a CSV result value can be generated by performing an XOR operation on the first masked CSV and the second masked CSV. In an aspect, the method can be applied wherein masks of equal value can be applied to two fundamentally different components (e.g., key and data) of a cryptographic process. In the cryptographic specification, the XOR operation can be performed in a system XOR operator C005 in FIG. 1.

In an aspect, the CSV result value can be generated by performing an XOR operation (e.g., an AES AddRoundKey function which is an XOR operation) on the first masked CSV (e.g., masked round key) and the second masked CSV (e.g., masked input data just prior to the AES AddRoundKey function). As a result, the CSV result value can be state register data in clear form (e.g., K+D, wherein K represents key and D represents data).

At step 908, a modified CSV result value can be generated by performing an operation on a second random number and the CSV result value, wherein the modified CSV result value can be stored. In an aspect, the clear form of the CSV can be stored after applying a CSV result value mask (e.g., second random number). The masked CSV result value can be retrieved and the CSV result value mask can be removed by performing an XOR operation on the retrieved CSV result value and the CSV result value mask (e.g., second random number).

It should be noted that the method can be applied to more than key and data scenario. Any computational result of a mathematical operation can be CSVs. For example, the result of a multiply operation (e.g., Montgomery Multiply operation) can be CSV. As another example, the result of an Elliptical curve calculation can be CSV. The CSV can be stored in a memory. In an aspect, each time a repeated calculation result is stored, it can be stored according to an apportioned mask and recovered by performing an XOR operation on the apportioned mask each time the calculation result was retrieved. The same mask can be maintained and applied to CSV recover the clear form of data.

Figure 10:
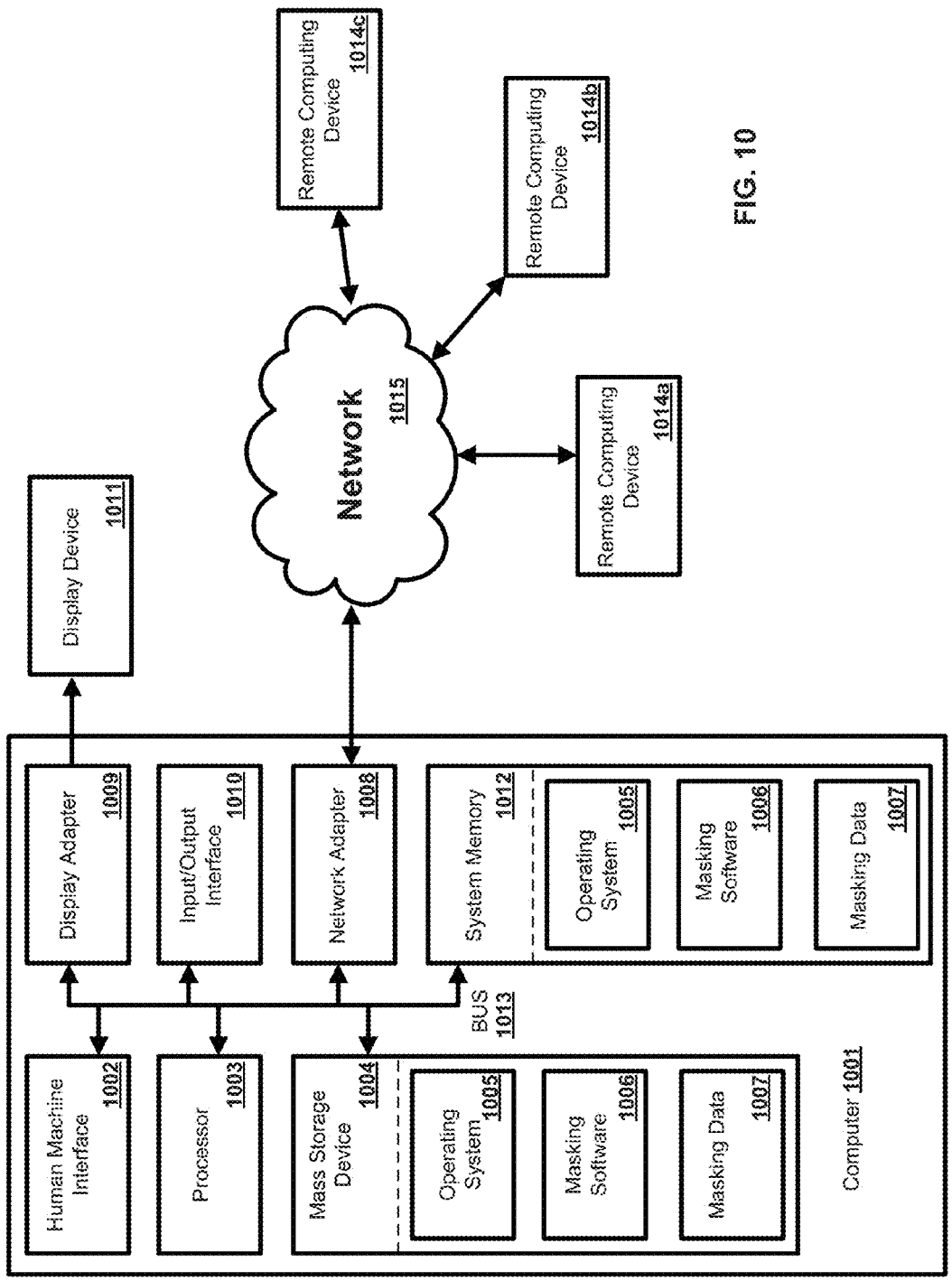
FIG. 10 is a block diagram illustrating an example computing device in which the present methods and systems can operate.

FIG. 10 is a block diagram illustrating an example computing device in which the present methods and systems can operate. In an exemplary aspect, the methods and systems of the present disclosure can be implemented on computer 1001 as illustrated in FIG. 10 and described below. By way of example, the system 100 in FIG. 1, FIG. 3, FIG. 4, FIG. 5 and FIG. 6 or Substitution tables 102 in FIG. 2 can be computer 1001 as illustrated in FIG. 10. Similarly, the methods and systems disclosed can utilize one or more computing devices to perform one or more functions in one or more locations. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1001. The components of the computer 1001 can comprise, but are not limited to, one or more processors or processing units 1003, a system memory 1012, and a system bus 1013 that couples various system components including the processor 1003 to the system memory 1012. In the case of multiple processing units 1003, the system can utilize parallel computing.

The system bus 1013 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA). Universal Serial Bus (USB) and the like. The bus 1013, and all buses specified in this description can also be implemented over a wired or wireless network connection and each of the subsystems, including the processor 1003, a mass storage device 1004, an operating system 1005, masking software 1006, masking data 1007, a network adapter 1008, system memory 1012, an Input/Output Interface 1010, a display adapter 1009, a display device 1011, and a human machine interface 1002, can be contained within one or more remote computing devices 1014*a,b,c* at physically separate locations, connected through buses of this form, in effect implementing a fully distributed system.

The computer 1001 typically comprises a variety of computer readable media. Exemplary readable media can be any available media that is accessible by the computer 1001 and comprises, for example and not meant to be limiting, both volatile and non-volatile media, removable and non-removable media. The system memory 1012 comprises computer readable media in the form of volatile memory, such as random access memory (RAM), and/or non-volatile memory, such as read only memory (ROM). The system memory 1012 typically contains data, such as masking data 1007, and/or program modules, such as operating system 1005 and masking software 1006, that are immediately accessible to and/or are presently operated on by the processing unit 1003.

In another aspect, the computer 1001 can also comprise other removable/non-removable, volatile/non-volatile computer storage media. By way of example, FIG. 10 illustrates a mass storage device 1004 which can provide non-volatile storage of computer code, computer readable instructions, data structures, program modules, and other data for the computer 1001. For example and not meant to be limiting, a mass storage device 1004 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1004, including by way of example, an operating system 1005 and masking software 1006. Each of the operating system 1005 and masking software 1006 (or some combination thereof) can comprise elements of the programming and the masking software 1006. Masking data 1007 can also be stored on the mass storage device 1004. Masking data 1007 can be stored in any of one or more databases known in the art. Examples of such databases comprise, DB2®, Microsoft® Access, Microsoft® SQL Server, Oracle@, mySQL. PostgreSQL, and the like. The databases can be centralized or distributed across multiple systems.

In another aspect, the user can enter commands and information into the computer 1001 via an input device (not shown). Examples of such input devices comprise, but are not limited to, a keyboard, pointing device (e.g., a "mouse"), a microphone, a joystick, a scanner, tactile input devices, such as gloves, and other body coverings, and the like These and other input devices can be connected to the processing unit 1003 via a human machine interface 1002 that is coupled to the system bus 1013, but can be connected by other interface and bus structures, such as a parallel port, game port, an IEEE 1394 Port (also known as a Firewire port), a serial port, or a universal serial bus (USB).

In yet another aspect, a display device 1011 can also be connected to the system bus 1013 via an interface, such as a display adapter 1009. It is contemplated that the computer 1001 can have more than one display adapter 1009 and the computer 1001 can have more than one display device 1011. For example, a display device can be a monitor, an LCD (Liquid Crystal Display), or a projector. In addition to the display device 1011, other output peripheral devices can comprise components, such as speakers (not shown) and a printer (not shown) which can be connected to the computer 1001 via Input/Output Interface 1010. Any step and/or result of the methods can be output in any form to an output device. Such output can be any form of visual representation, including, but not limited to, textual, graphical, animation, audio, tactile, and the like. The display 1011 and computer 1001 can be part of one device, or separate devices.

The computer 1001 can operate in a networked environment using logical connections to one or more remote computing devices 1014a,b,c. By way of example, a remote computing device can be a personal computer, portable computer, smartphone, a server, a router, a network computer, a peer device or other common network node, and so on. Logical connections between the computer 1001 and a remote computing device 1014a,b,c can be made via a network 1015, such as a local area network (LAN) and/or a general wide area network (WAN). Such network connections can be through a network adapter 1008. A network adapter 1008 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 1005 are illustrated herein as discrete blocks, although it is recognized that such programs and components reside at various times in different storage components of the computing device 1001, and are executed by the data processor(s) of the computer. An implementation of masking software 1006 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AT) techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    generating a first output by performing an operation on a first random number and a first data block, wherein the first output is stored in a first bank;

retrieving a set of stored first outputs by performing an operation on a second data block, wherein the operation on the second data block comprises a substitution table look-up operation in the first bank;

generating a second output by performing an operation on the first output and the second data block;

generating a third output by performing an operation on a second random number and the first data block, wherein the third output is stored in a second bank;

retrieving a set of stored third outputs by performing an operation on the second data block, wherein the operation on the second data block comprises a substitution table look-up operation in the second bank;

generating a fourth output by performing an operation on the retrieved set of stored third outputs and the second data block; and generating a fifth output by performing a multiplexing operation on the second output and the fourth output, wherein the fifth output comprises a cryptographically sensitive value.

2. The method of claim 1, further comprising:

generating a sixth output by performing an XOR operation on a third random number and the fifth output; and storing the sixth output.

3. The method of claim 2, further comprising:

generating a seventh output by performing an XOR operation on a fourth random number and a third data block, wherein the third data block is generated via applying the fifth output to an AES key expansion operation, wherein the seventh output is stored;

re-masking the seventh output by retrieving the stored seventh output, performing an XOR operation on the stored seventh output and the fourth random number to obtain the third data block, and performing an XOR operation on a fifth random number and the third data block, and wherein the re-masked seventh output is stored;

generating an eighth output by performing an XOR operation on the fourth random number and a fourth data block, and wherein the fourth data block comprises an input data block;

generating a ninth output by performing a multiplexing operation between the sixth output and the eighth output; and generating a tenth output by performing an XOR operation on the re-masked seventh output and the ninth output.

4. The method of claim 2, wherein the fifth output is obtained by performing an XOR operation on the third random number and the sixth output.

5. The method of claim 1, wherein the first random number comprises a prior mask for the first data block and the second random number comprises a next mask for the first data block.

6. The method of claim 1, wherein the first data block comprises a Substitution table in Advanced Encryption Standard (AES), the second data block comprises a state array in AES, the first random number comprises a prior mask for the Substitution table, and the second random number is a next mask for the Substitution table.

7. The method of claim 1, wherein the first data block is a table that comprises a Substitution table, shift row and mix columns in Advanced Encryption Standard (AES), the second data block comprises a state array in AES, the first random number comprises a prior mask for the table, and the second random number comprises a next mask for the table.

8. The method of claim 1, wherein the first data block comprises a table that comprises an inverse Substitution table, inverse shift row and inverse mix columns in Advanced Encryption Standard (AES), and wherein the second data block comprises a state array in AES, the first random number comprises a prior mask for the table, and the second random number comprises a next mask for the table.

9. The method of claim 1, wherein performing the operation on the first random number and the first data block comprises performing an XOR operation on the first random number and the first data block.

10. The method of claim 1, wherein performing the operation on the second random number and the first data block comprises performing an XOR operation on the second random number and the first data block.

11. The method of claim 1, wherein performing the operation on the first output and the second data block comprises performing the operation on the first output and the second data block according to a substitution byte mechanism in one or more AES, DES, or triple DES.

12. The method of claim 1, wherein performing the operation on the third output and the second data block comprises performing an operation on the third output and the second data block according to a substitution byte mechanism in one or more of AES, DES, or triple DES.

13. The method of claim 1, wherein the method is executed on specific clock cycles of a clock schedule, and the specific clock cycles are defined by a random function.

14. The method of claim 1, further comprising reading the one or more of the second output and the fourth output according to a random address function.

15. A method comprising:

generating a first masked cryptographically sensitive value (CSV) by performing an XOR operation on a first random number and a first cryptographically sensitive value;

generating a second masked cryptographically sensitive value (CSV) by performing an XOR operation on the first random number and a second cryptographically sensitive value;

generating a CSV result value by performing an XOR operation on the first masked CSV and the second masked CSV; and generating a modified CSV result value by performing an operation on a second random number and the CSV result value, wherein the modified CSV result value is stored.

16. The method of claim 15, further comprising retrieving the CSV result value by performing an XOR operation on the second random number and the modified CSV result value.

17. The method of claim 15, wherein generating the first masked CSV, generating the second masked CSV, and generating the CSV result value are repeated until a first threshold is detected, and wherein the first random number is the same in each repetition.

18. The method of claim 15, wherein the generating the first masked cryptographically sensitive value (CSV) further comprises storing the first masked CSV, and wherein the stored first masked CSV is read according to a random address function.

19. The method of claim 15, wherein the generating the second masked cryptographically sensitive value (CSV) further comprises storing the second masked CSV, wherein the stored second masked CSV is read according to a random address function.

20. A system comprising:

a random number generator, configured for generating a plurality of random numbers, wherein the plurality of random numbers comprise a first random number and a second random number, a processor, configured for, generating a first output by performing an operation on the first random number and a first data block, wherein the first output is stored, retrieving a set of stored first outputs by performing an operation on a second data block, wherein the operation on the second data block comprises a substitution table look-up operation, generating a second output by performing an operation on the first output and the second data block, generating a third output by performing an operation on the second random number and the first data block, wherein the third output is stored, retrieving a set of stored third outputs by performing an operation on the second data block, wherein the operation on the second data block comprises a substitution table look-up operation, generating a fourth output by performing an operation on the retrieved set of stored third outputs and the second data block, and generating a fifth output by performing a multiplexing operation the second output and the fourth output, wherein the fifth output comprises a cryptographically sensitive value, and a storage system, configured for storing the first data block, the second data block, the set of stored first outputs, and the set of stored third outputs.

* * * * *